(12) United States Patent
Yudahira et al.

(10) Patent No.: US 7,242,196 B2
(45) Date of Patent: Jul. 10, 2007

(54) POWER SUPPLY CONTROLLER APPARATUS FOR DETECTING WELDING OF CONTACTORS

(75) Inventors: Hirofumi Yudahira, Ibusuki (JP); Yasushi Matsukawa, Toyohashi (JP)

(73) Assignee: Panasonic EV Energy Co., Ltd., Shizuoka (JP)

(*) Notice: Subject to any disclaimer, the term of this patent is extended or adjusted under 35 U.S.C. 154(b) by 115 days.

(21) Appl. No.: 11/237,113

(22) Filed: Sep. 28, 2005

(65) Prior Publication Data
US 2006/0071618 A1    Apr. 6, 2006

(30) Foreign Application Priority Data

Sep. 28, 2004 (JP) .......................... P 2004-282465
Sep. 21, 2005 (JP) .......................... P 2005-274340

(51) Int. Cl.
   *G01R 31/04*    (2006.01)
(52) U.S. Cl. .................. 324/420; 324/418; 324/527
(58) Field of Classification Search ................ 324/418, 324/420, 512, 522, 523, 527, 540, 635, 644; 361/115; 307/132 R, 132 E, 132 EA; 340/638, 340/644
See application file for complete search history.

(56) References Cited

U.S. PATENT DOCUMENTS 3,626,248 A * 12/1971 Bartlett et al. ................ 361/1
4,713,716 A * 12/1987 Takemura et al. ............. 361/2
4,914,315 A *  4/1990 Nickolai ..................... 307/137
5,134,375 A *  7/1992 Fuchi ......................... 324/419
5,455,733 A * 10/1995 Waggamon .................. 361/115
6,023,110 A *  2/2000 Henrion et al. ............. 307/125
6,680,589 B2 *  1/2004 Neranjan et al. ............. 318/34
6,813,132 B1 * 11/2004 Mitlmeier et al. .......... 361/160
6,828,798 B2 * 12/2004 Morimoto .................... 324/527
7,038,895 B2 *  5/2006 Imai et al. .................... 361/23

FOREIGN PATENT DOCUMENTS

JP        2000134707         5/2000

* cited by examiner

*Primary Examiner*—Bentsu Ro
(74) *Attorney, Agent, or Firm*—Workman Nydegger

(57) ABSTRACT

A power supply controller apparatus is provided for use in a power supply apparatus including a battery assembly. The power supply controller apparatus includes a controller that controls supplying power to a load from said battery assembly through a capacitor connected between first and second contactors by turning on and off each of contactors. The controller detects whether or not each contactor is welded based on an output signal from one output terminal of both ends of the capacitor, when the each contactor is controlled to be turned off and an AC signal is applied to one input terminal of (a) one end of the battery assembly, (b) the other end of the battery assembly, and (c) each connection point between secondary batteries of the battery assembly.

19 Claims, 15 Drawing Sheets

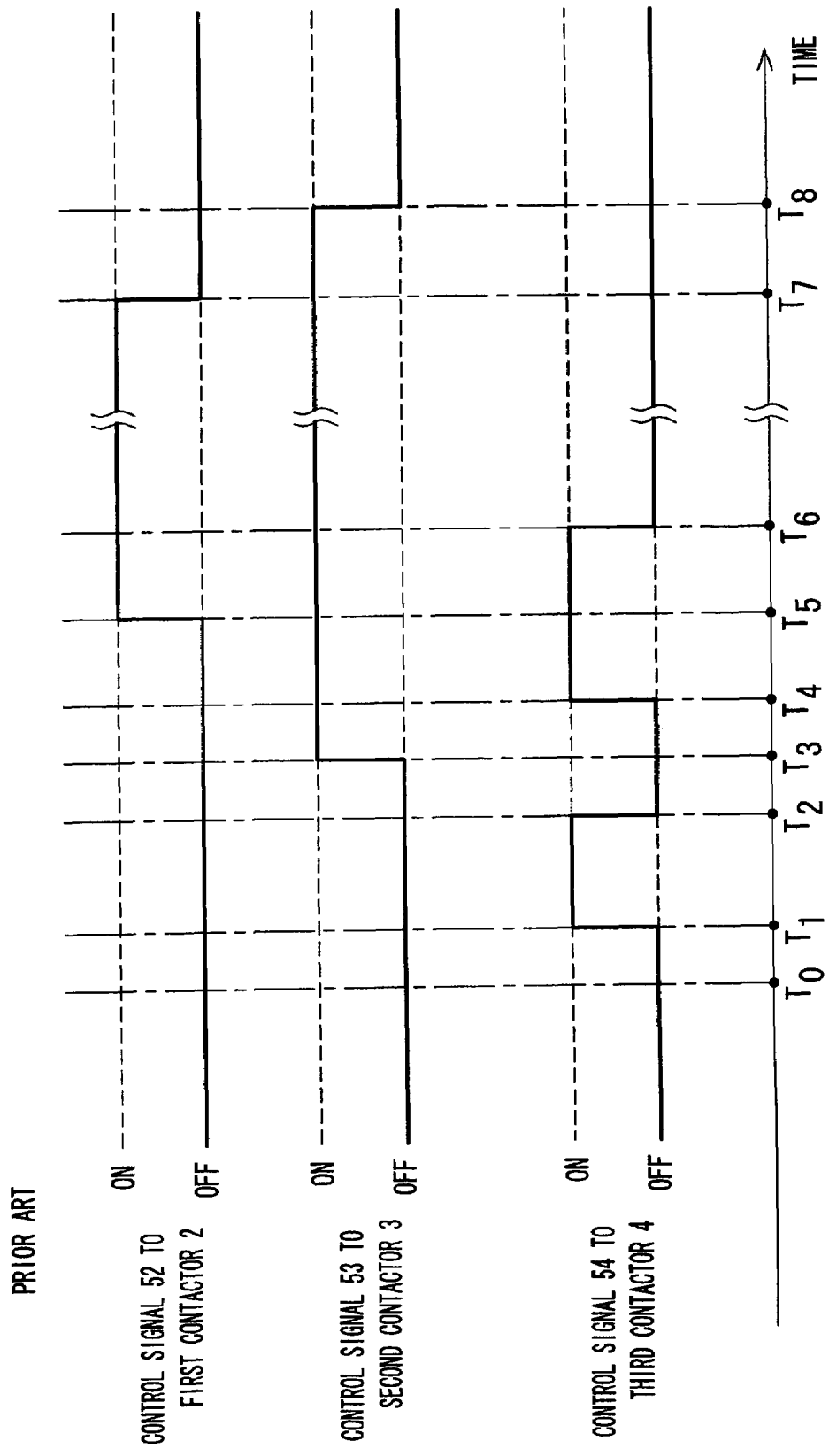

POWER SUPPLY CONTROLLER APPARATUS FOR DETECTING WELDING OF CONTACTORS

BACKGROUND OF THE INVENTION

1. Field of the Invention

The present invention relates to a power supply controller apparatus for use in a power supply apparatus. In particular, the present invention relates to power supply controller apparatus for detecting whether or not each contactor is welded using an AC signal.

2. Description of the Related Art

In recent years, in electric vehicles such as pure electric vehicles (PEVs), hybrid electric vehicles (HEVs) or the like, the power supply apparatus using secondary batteries such as nickel-metal hydride batteries with high-energy density (hereinafter referred as to "nickel-hydrogen batteries") or the like has been used as a power source for use in a motor or a drive source for various types of loads. The power supply apparatus for use in an electric vehicle requires a total voltage of 100V to 350V. The output voltage of a single battery (a cell), which is the minimum unit of a battery assembly constituting the power supply apparatus, is approximately 1.2V. Hence, in usual, a plurality of cells (e.g. 100 cells) are connected in series to each other to obtain a desired total voltage.

Contactors (relays) are provided between the power supply apparatus and the motor to connect and disconnect the power source. For example, in PEVs, when a vehicle driver turns on an ignition key to start supply of the power, the contactors are controlled to be in conductive state to connect the power supply apparatus to the motor, and then the motor is driven to rotate. When the vehicle driver turns off the ignition key, the contactors are controlled to be in non-conductive state to disconnect the power supply apparatus from the motor, and then the motor is stopped.

Generally speaking in PEVs and HEVs, a capacitor for smoothing the output voltage is provided in order to stably supply a DC voltage to the motor. As described above, the total voltage of the power supply apparatus is extremely high. Hence, in the case that the contactors are controlled to be in conductive state when the electrical charge of the capacitor is almost empty, a large-current instantaneously flows between the conducting contacts of the contactor. By repeating this, the contacts are heated, melted, and then pressured, and as a result, the contacts might be welded each other. The welding of the contactors causes malfunction of the entire apparatus. A power supply controller apparatus of a prior art for detecting welding of contactors is disclosed in the Japanese patent laid-open publication No. 2000-134707.

Referring to FIGS. 14 and 15, the power supply controller apparatus of the prior art will be described.

FIG. 14 is a block diagram showing a configuration of an electric vehicle having the power supply controller apparatus of the prior art. In FIG. 14, a battery assembly 1 has such a configuration that a plurality of single batteries are connected in series to each other. The positive terminal of the battery assembly 1 is connected to a first contactor 2. The negative terminal of the battery assembly 1 is connected to a second contactor 3. A third contactor 4 and the current-limiting resistance 5 form a series circuit. The series circuit is connected in parallel to the first contactor 2.

Each of the first contactor 2, the second contactor 3, and the third contactor 4 includes a moving contact and a fixed contact. Each contactor switches over between conductive state (ON state) and non-conductive state (OFF state) of the contacts under control of a controller 8.

An inverter 32 is constituted by a plurality of transistors and a plurality of diodes. The inverter 32 sequentially applies the power supply voltages to respective phases of the motor 34 to drive the motor 34. A capacitor 6 is a smoothing capacitor for stably supplying a DC voltage to the inverter 32. A voltage detector 7 detects a voltage $V_{inv}$ applied between both ends of the inverter 32 (hereinafter referred as to "an inverter voltage $V_{inv}$").

The controller 8 receives an input signal from an operation input part 36 and controls switching over of each contactor between conductive state and non-conductive state thereof. The controller 8 reads out the inverter voltage $V_{inv}$ from the voltage detector 7 and detects welding of each contactor depending on the control state of each contactor. The controller 8 outputs display information for notifying the operator of incidence of the welding to a display output part 38, to display the same information thereon when the controller 8 determines that any contactor is welded.

The operation input part 36 is, for example, an ignition key that is operated by an operator such as a driver of the electric vehicle or the like. The display output part 38 is, for example, a lighting apparatus such as LEDs or the like. In the case that the controller 8 determines that any contactor is welded, the display output part 38 is made to be lighted responsive to an instruction from the controller 8 to notify the operator of incidence of the welding.

Referring to FIG. 15, a process for detecting welding of the contactors in the power supply controller apparatus of the prior art will be described. FIG. 15 is a timing chart showing control signals 52, 53 and 54 from the controller 8 to the first contactor 2, the second contactor 3, and the third contactor 4, respectively, regarding a typical operation in a power supply controller apparatus for use in an electric vehicle.

At the timing $T_O$, the operator turns on the ignition key of the operation input part 36 to supply the power. At this timing, since the contactors 2, 3 and 4 are controlled to be turned off. Therefore, if no contactors are welded, the inverter voltage $V_{inv}$ detected by the voltage detector 7 is almost zero during the time interval between the timings $T_O$ and $T_1$. That is, if the inverter voltage $V_{inv}$ detected by the voltage detector 7 increases for this time interval, it shows that at least one of the first contactor 2 and the third contactor 4, and the second contactor 3 are welded.

At the timing $T_1$, the third contactor 4 is controlled to be turned on. If no contactors are welded, the inverter voltage $V_{inv}$ detected by the voltage detector 7 is almost zero during the time interval between the timings $T_1$ and $T_2$. That is, if the inverter voltage $V_{inv}$ detected by the voltage detector 7 increases for this time interval, it shows that the second contactor 3 is welded.

At the timing $T_2$, the third contactor 4 is controlled to be turned off before the second contactor 3 is controlled to be turned on at the timing $T_3$. If no contactors are welded, the inverter voltage $V_{inv}$ detected by the voltage detector 7 is almost zero during the time interval between the timings $T_3$ and $T_4$. That is, if the inverter voltage $V_{inv}$ detected by the voltage detector 7 increases for this time interval, it shows that at least one of the first contactor 2 and the third contactor 4 is welded.

At the timing $T_4$, with keeping the second contactor 3 be turned on, the third contactor 4 is controlled to be turned on again. The precharge of the capacitor 6 is started. At this timing, since the current-limiting resistance 5 is provided, no large-current flows between the contacts of the third contactor 4. At the timing $T_5$ when the capacitor 6 is fully charged, the first contactor 2 is controlled to be turned on, and then the voltage of the battery assembly 1 is applied to the inverter 32 so as to start driving of the motor 34. At the timing $T_6$, the third contactor 4 is controlled to be turned off.

Further, at the timing $T_7$, the operator turns off the ignition key. At the same timing, the first contactor 2 is controlled to be turned off to stop driving of the motor 34. If no contactors are welded, the inverter voltage $V_{inv}$ detected by the voltage detector 7 decreases during the time interval between the timings $T_7$ and $T_8$. That is, if the inverter voltage $V_{inv}$ detected by the voltage detector 7 does not decrease and is kept be nearly equal to the voltage between both ends of the battery assembly 1 for this time interval, it shows that the first contactor 2 is welded. At the timing $T_8$, the second contactor 3 is controlled to be turned off. As described above, the power supply controller apparatus of the prior art detects which contactor is welded.

However, as is understood from FIG. 15, in the power supply controller apparatus of the prior art, the controller 8 is required to keep the third contactor 3 be turned on during the time interval between the timings $T_1$ and $T_2$ for the purpose of detecting welding of the second contactor 3. This leads to that the number of time of switching of the third contactor 4 is twice as much as that in the case of no welding detection. This causes reduction of the service life of the third contactor 4, by extension, causes reduction of the service life of the entire electric vehicle.

Additionally, in the case that the inverter voltage $V_{inv}$ is measured, necessary circuits and wire harnesses for measuring the inverter voltage $V_{inv}$ cost high. Furthermore, in the case that the value of the inverter voltage $V_{inv}$ is read out from the other electronic control unit (ECU) that controls the inverter, it takes time to communicate with each other. It is disadvantageous to shorten the time required for welding detection.

Additionally, for the purpose of detecting welding of the first contactor 2, electric charge in the smoothing capacitor (the capacitor 6 of FIG. 14) is required to be discharged for security, and therefore, it takes time to wait for discharging the capacitor during the time interval between the timings $T_7$ and $T_8$ of FIG. 15 (usually more than 10 minutes). An additional load for discharging the electric charge in short time increases the number of components, and as a result, the power supply controller apparatus becomes more expensive.

BRIEF SUMMARY OF THE INVENTION

A power supply controller apparatus in accordance with the present invention is made to solve at least one of the above-mentioned problems, and an object of the present invention is to provide a power supply controller apparatus that is low in cost and longer in its service life, and can execute welding detection of contactors with higher accuracy in shorter time.

In order to solve the above-mentioned problems, the present invention has configurations described below.

According to the first aspect of the present invention, there is provided a power supply controller apparatus for use in a power supply apparatus comprising a battery assembly consisting of at least one secondary battery connected in series. The power supply apparatus further comprises a first contactor having one end connected to one end of the battery assembly, and a second contactor having one end connected to the other end of the battery assembly. The power supply controller apparatus includes a controller for controlling supplying power to a load from said battery assembly through a capacitor connected between the other end of the first contactor and the other end of the second contactor, by turning on and off each of contactors. The controller detects whether or not each contactor is welded based on an output signal from one output terminal of one and the other ends of the capacitor, when each contactor is controlled to be turned off and an AC signal is applied to one input terminal of (a) one end of the battery assembly, (b) the other end of the battery assembly, and (c) each connection point between secondary batteries of the battery assembly.

Since the present invention allows the welding detection of the contactors without measuring the inverter voltage, circuits and wire harnesses for measuring the inverter voltage, which are required in the prior art, are not required, and as a result, the present invention is low in cost. Additionally, since the welding detection of the contactors according to the present invention is executed in only in the power supply controller apparatus, the communication with the external unit is not required, and as a result, the time required for the communication can be shortened. Furthermore, since electric charge in the capacitor is not required to be discharged for the purpose of detecting welding of the first contactor, the time required for the welding detection can be shortened. No load for discharging the electric charge is required. In accordance with the present invention, the welding detection of the contactors is executed at low cost and in shorter time.

According to the second aspect of the present invention, there is provided a program including a power supply control method for use in a power supply apparatus comprising a battery assembly consisting of at least one secondary battery connected in series. The power supply apparatus further comprises a first contactor having one end connected to one end of the battery assembly, and a second contactor having one end connected to the other end of the battery assembly. The power supply control method comprises a control step for controlling supplying power to a load from said battery assembly through a capacitor connected between the other end of the first contactor and the other end of the second contactor, by turning on and off each of contactors. The control step detects whether or not each contactor is welded based on an output signal from one output terminal of one and the other ends of the capacitor, when each contactor is controlled to be turned off and an AC signal is applied to one input terminal of (a) one end of the battery assembly, (b) the other end of the battery assembly, and (c) each connection point between secondary batteries of the battery assembly. In accordance with the present invention, the welding detection of the contactors is executed at low cost and in shorter time.

According to the third aspect of the present invention, there is provided a program including the above-mentioned power supply control method. In accordance with the present invention, the welding detection of the contactors is executed at low cost and in shorter time.

According to the fourth aspect of the present invention, there is provided a computer-readable recording medium for storing the above-mentioned program. In accordance with the present invention, the welding detection of the contactors is executed at low cost and in shorter time.

In accordance with the power supply controller apparatus and the power supply control method, since the welding of the contactors can be detected without measuring the inverter voltage, circuits and wire harnesses for measuring the inverter voltage are not required, and as a result, the cost is reduced. Additionally, since the communication with the external unit is not required, the time required for the communication can be shortened. Furthermore, since electric charge in the capacitor is not required to be discharged for the purpose of detecting welding of the first contactor, the welding detection is executed in a shorter amount of time compared with that of the prior art. The present invention has the effect of realizing the power supply controller apparatus that executes the welding detection of the contactors at low cost and in shorter time.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 15 is a timing chart showing a process for welding detection of the prior art.

It will be recognized that some or all of the figures are schematic representations for purposes of illustration and do not necessarily depict the actual relative sizes or locations of the elements shown.

DETAILED DESCRIPTION OF THE PREFERRED EMBODIMENTS

Preferred embodiments specifically exemplifying the best mode for carrying out the present invention will be described below referring to the accompanying drawings.

First Preferred Embodiment

Figure 1:
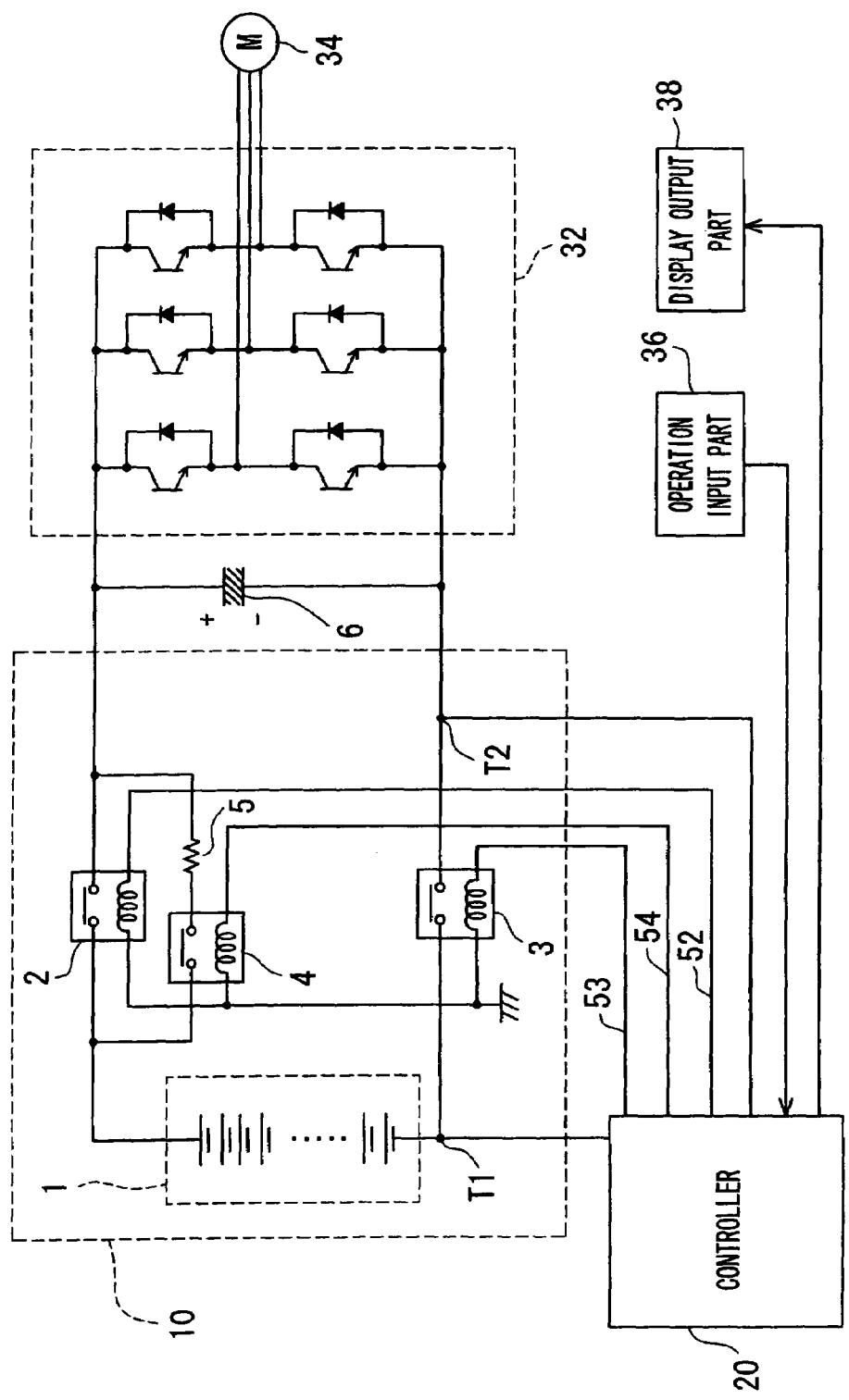
FIG. 1 is a block diagram showing a configuration of an electric vehicle having a power supply controller apparatus in accordance with a first preferred embodiment of the present invention.

Referring to FIGS. 1 to 5, the power supply controller apparatus in accordance with the first preferred embodiment of the present invention will be described. FIG. 1 is a block diagram showing a configuration of a pure electric vehicle (PEV) having the power supply controller apparatus in accordance with the first preferred embodiment of the present invention. In FIG. 1, the pure electric vehicle includes a power supply apparatus 10, a controller 20, a capacitor 6, an inverter 32, a motor 34, an operation input part 36, and a display output part 38. The power supply apparatus 10 includes a battery assembly 1, a first contactor 2, a second contactor 3, a third contactor 4, and a current-limiting resistance 5.

The battery assembly 1 has such a configuration that a plurality of secondary batteries (e.g. 250 nickel-hydrogen batteries) are connected in series, each secondary battery has a rated voltage of 1.2V, and is a power source with a total voltage of 300V. The positive terminal of the battery assembly 1 is connected to the first contactor 2. The negative terminal of the battery assembly 1 is connected to the second contactor 3. The third contactor 4 and the current-limiting resistance 5 form a series circuit. The series circuit is connected in parallel to the first contactor 2. Each of the first contactor 2, the second contactor 3, and the third contactor 4 includes a moving contact and a fixed contact and further includes a coil for operating the moving contact. One end of each coil is connected to a ground potential. Each contactor switches over between conductive state (ON state) and non-conductive state (OFF state) of the contacts under control of the controller 20.

The inverter 32 is constituted by a plurality of pairs of a transistor that can switch over at a high speed, such as an IGBT (Insulated Gate Bipolar Transistor) or the like, and a diode. The inverter 32 converts DC power source to AC power source and sequentially applies the power sources to respective phases of the motor 34, and as a result, the motor 34 drives to rotate. The motor 34 is use in a three-phase drive system. The motor 34 is driven to rotate, for example, due to a torque given to magnets buried in a rotor, by a voltage applied to stator coils. The capacitor 6 is a smoothing capacitor with a rated capacity of 1000 μF to 3000 μF and is provided for preventing change in a voltage to be applied to the inverter 32 and stably supplying a DC voltage to the inverter 32.

The controller 20 receives an input signal from the operation input part 36 and controls respective contactors 2, 3 and 4. The controller 20 executes the welding detection at a predetermined timing. The controller 20 is connected to an input terminal T1 and an output terminal T2. The input terminal T1 is connected to the negative electrode of the battery assembly 1 and is provided for sending therethrough an AC signal for the welding detection of each contactor to the power supply 10. The output terminal T2 is connected to one end on the inverter side of the second contactor 3 and is provided for returning therethrough the AC signal sent to the power supply apparatus 10. The controller 20 detects whether or not the first contactor 2, the second contactor 3, and the third contactor 4 are welded (as will hereinafter be described in detail). If the controller 20 determines that the welding occurs, the controller 20 outputs display information for notifying the operator of incidence of the welding to the display output part 38, to display the same information thereon.

The operation input part 36 is, for example, an ignition key operated by an operator (a driver of the electric vehicle) etc. The display output part 38 is, for example, LEDs, a liquid crystal panel, a speaker etc. In the case that the welding of a contactor is detected, the display output part 38 is instructed from the controller 20 to notify the operator of incidence of the welding by sound or display.

Figure 2:
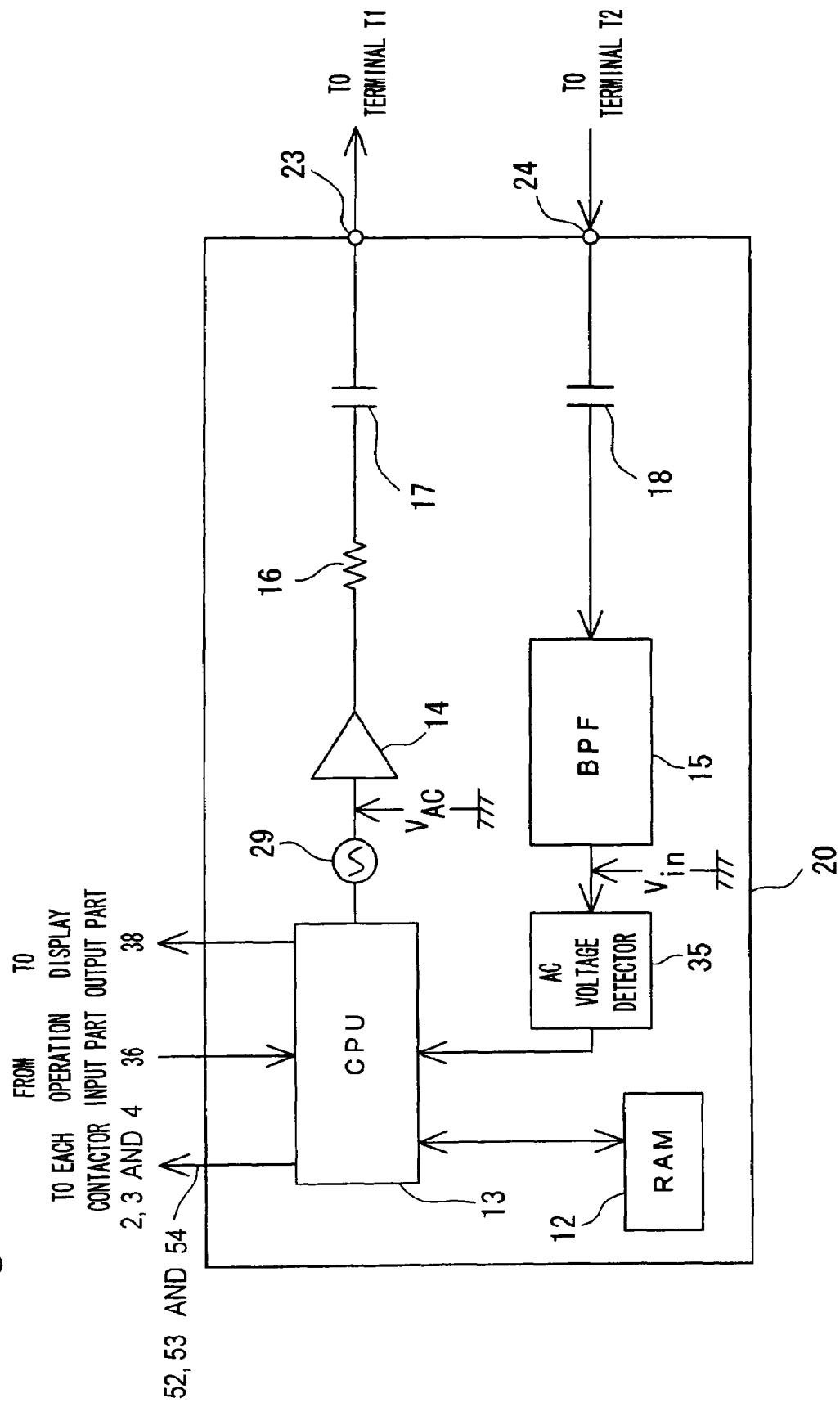
FIG. 2 is a block diagram showing a detailed configuration of a controller 20 in accordance with the first preferred embodiment of the present invention.

Referring to FIG. 2, the configuration and operation of the controller 20 are described. FIG. 2 is a block diagram showing a detailed configuration of the controller 20 in accordance with the first preferred embodiment of the present invention. In FIG. 2, the controller 20 includes a first terminal 23, a second terminal 24, a first coupling capacitor 17, an output impedance 16, a buffer circuit 14, an AC voltage generator 29, a CPU 13, an AC voltage detector 35, a BPF (band-pass filter) 15, a second coupling capacitor 18, and a RAM 12 (Random Access Memory/a storing part).

The first terminal 23 is connected to the input terminal T1 of FIG. 1. The second terminal 24 is connected to the output terminal T2 of FIG. 1. One end of the first coupling capacitor 17 is connected to the first terminal 23. The output impedance 16 is connected in series to the first coupling capacitor 17. An output terminal of the buffer circuit 14 is connected to the output impedance 16. An output terminal of the AC voltage generator 29 is connected to the input terminal of the buffer circuit 14. An output terminal of the AC voltage detector 35 is connected to the input terminal of the CPU 13. An output terminal of the BPF 15 is connected to the input terminal of the AC voltage detector 35. The second coupling capacitor 18 is connected between the BPF 15 and the second terminal 24. The RAM 12 is connected to the CPU 13.

A digital signal from the CPU 13, which indicates a frequency and a voltage, is inputted to the AC voltage generator 29. The AC voltage generator 29, responsive to the digital signal, generates and outputs a sinusoidal AC voltage $V_{AC}$ (e.g. 5V) having a predetermined frequency (e.g. 1 Hz) indicated by the digital signal. The AC voltage detector 35 measures an amplitude level A of an input voltage $V_{in}$ inputted from the BPF 15, and outputs the amplitude level A to the CPU 13.

The CPU 13 such as a microcomputer or the like stores a program for executing a process for instructing the AC voltage generator 29 to output the AC voltage $V_{AC}$, a process for determining whether or not any contactor is welded depending on the amplitude level A of the input voltage $V_{in}$ measured by the AC voltage detector 35, a process for the input signals from the operation input part 36, a process for controlling the contactors 2, 3 and 4 and the display output part 38, etc. The CPU 13 receives an input signal from the operation input part 36, and controls respective contactors 2, 3 and 4. The CPU 13 executes the welding detection of the contactors at a predetermined timing. If the CPU 13 determines that any contactor is welded, the CPU 13 outputs display information for notifying the operator of incidence of the welding to the display output part 38, to display the same information thereon.

The buffer circuit 14 is provided for the purpose of preventing the electric interaction between circuit elements. The output impedance 16 such as a resistor gives a predetermined impedance to the controller 20. The first coupling capacitor 17 and the second coupling capacitor 18 block a DC component of a signal and get an AC component thereof passed.

Figure 3:
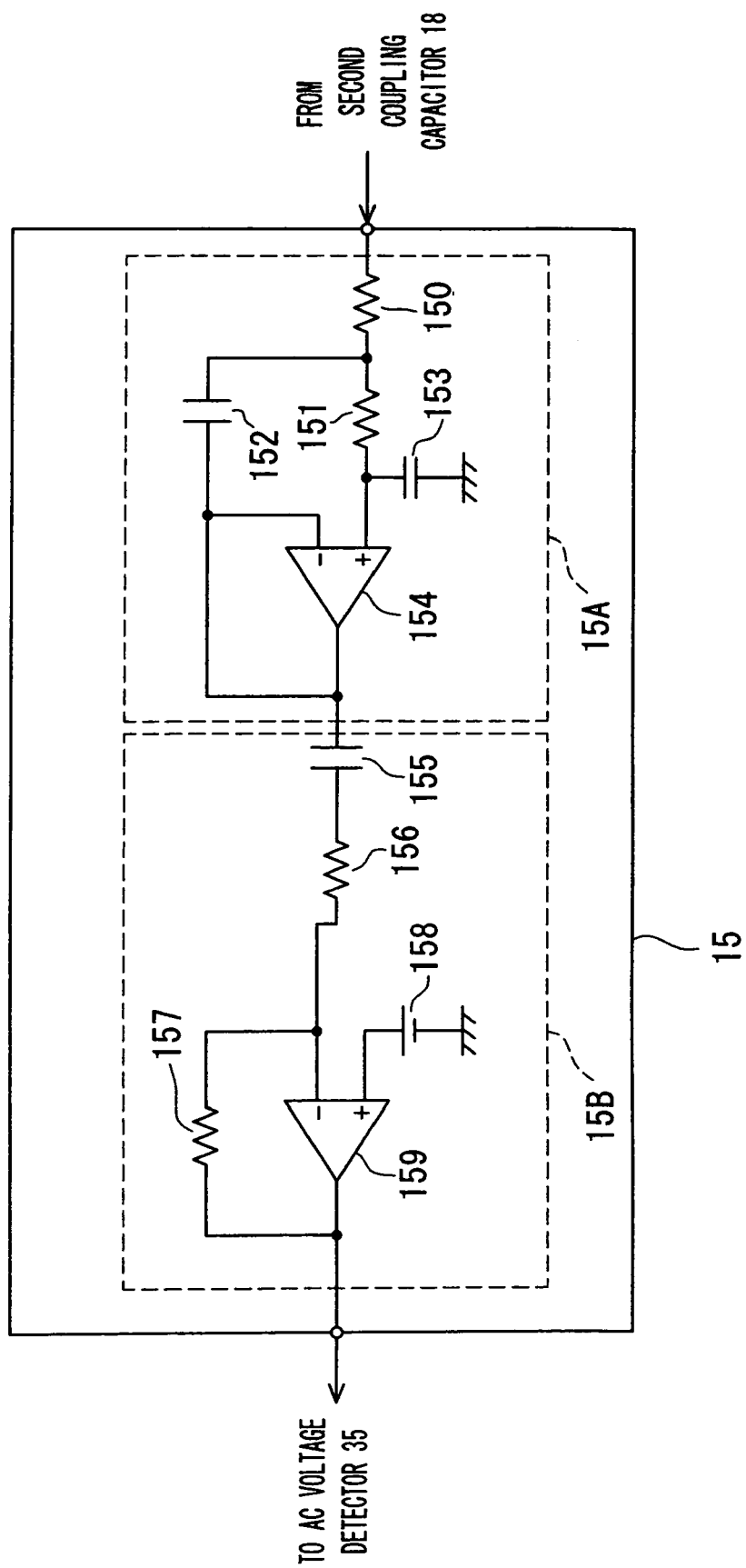
FIG. 3 is a circuit diagram showing a detailed configuration of a BPF 15 in accordance with the first preferred embodiment of the present invention.

FIG. 3 is a circuit diagram showing a detailed configuration of the BPF 15 in accordance with the first preferred embodiment of the present invention. In FIG. 3, the BPF 15 includes an LPF (low-pass filter) 15A constituted by resistances 150 and 151, capacitors 152 and 153, and an operational amplifier 154, and an HPF (high-pass filter) 15B constituted by a capacitor 155, resistances 156 and 157, a reference voltage 158, and an operational amplifier 159. The LPF 15A and the HPF 15B are series-connected to each other.

The BPF 15 allows a signal component to pass therethrough which has a frequency within a bandwidth between predetermined cutoff frequencies (an upper limit frequency and a lower limit frequency) among signals that are input through the second coupling capacitor 18, and attenuates the other signal components. Thus, the BPF 15 filters out noise component included in the input signal. By adjusting a resistance value of each resistance and/or a capacitance of each capacitor included in the BPF 15, the cutoff frequencies can be varied arbitrarily. Since various types of configurations and operations of the BPF are publicly known, their detailed description is omitted. In addition, although the BPF 15 is configured as a combination of the LPF and the HPF as shown in FIG. 3, it is possible to be configured using either one of the LPF and the HPF. The RAM 12 stores a predetermined threshold value $A_{th}$ for use when the CPU 13 executes the welding detection.

Figure 4:
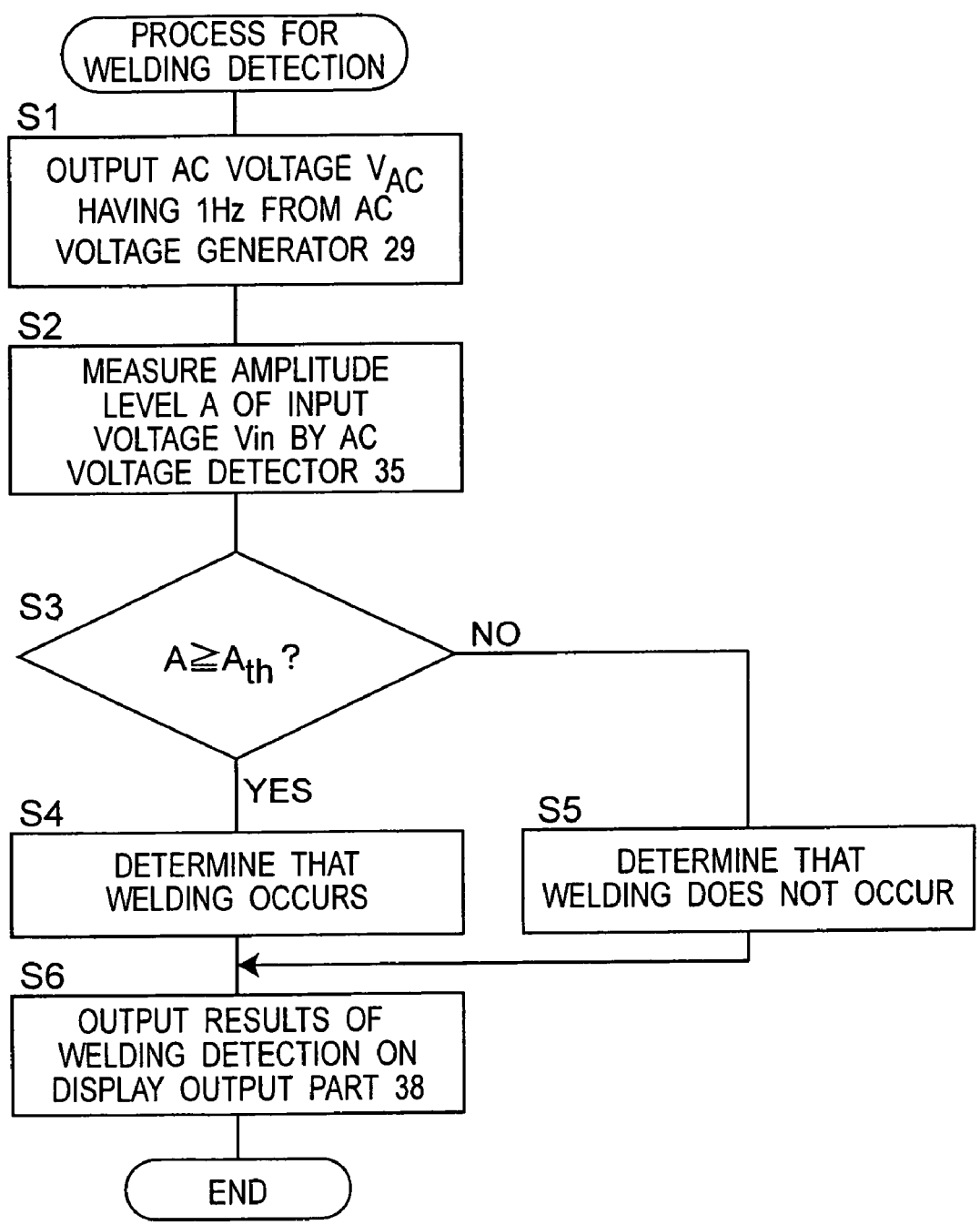
FIG. 4 is a flow chart showing a process for welding detection in accordance with the first preferred embodiment of the present invention.

Referring to FIG. 4, the operation of the power supply controller apparatus in accordance with the first preferred embodiment of the present invention in the case that any one of the first contactor 2, the second contactor 3, and the third contactor 4 is welded will be described below. FIG. 4 is a flow chart showing a process for the welding detection in accordance with the first preferred embodiment of the present invention.

First of all, the driver of the electric vehicle turns on the ignition key of the operation input part 36 to supply the power before the CPU 13 executes the welding detection at the timing when the first contactor 2, the second contactor 3, and the third contactor 4 are all controlled to be turned off. The CPU 13 instructs the AC voltage generator 29 to output an AC voltage $V_{AC}$ (a sinusoidal wave) having a predetermined frequency (e.g. 1 Hz) (at step S1).

In the case that the first contactor 2 is welded, the AC voltage $V_{AC}$ from the AC voltage generator 29 is inputted to the AC voltage detector 35 as the input voltage $V_{in}$ through the buffer circuit 14, the output impedance 16, the first coupling capacitor 17, the battery assembly 1, the first contactor 2, the capacitor 6, the second coupling capacitor 18, and the BPF 15. In the case that the second contactor 3 is welded, the AC voltage $V_{AC}$ from the AC voltage generator 29 is inputted to the AC voltage detector 35 as the input voltage $V_{in}$ through the buffer circuit 14, the output impedance 16, the first coupling capacitor 17, the second contactor 3, the second coupling capacitor 18, and the BPF 15. In the case that the third contactor 4 is welded, the AC voltage $V_{AC}$ from the AC voltage generator 29 is inputted to the AC voltage detector 35 as the input voltage $V_{in}$ through the buffer circuit 14, the output impedance 16, the first coupling capacitor 17, the battery assembly 1, the third contactor 4, the current-limiting resistance 5, the capacitor 6, the second coupling capacitor 18.

In any cases mentioned above, the AC voltage $V_{AC}$ from the AC voltage generator 29 is inputted to the AC voltage detector 35 as the input voltage $V_{in}$ through the second terminal 24, and then the AC voltage detector 35 measures the amplitude level A of the input voltage $V_{in}$ (at step S2). The CPU 13 checks whether or not the amplitude level A is equal to or larger than the threshold value $A_{th}$, which is read out from the RAM 12 (at step S3). In the case that each contactor is welded as described above, since the amplitude level A is equal to or larger than the threshold value $A_{th}$ (YES at step S3), the CPU 13 determines that any one of the first contactor 2, the second contactor 3, and the third contactor 4 is welded (at step S4).

On the contrary, in the case that no contactors are welded, the AC voltage $V_{AC}$ from the AC voltage generator 29 is cut off on its current application path. Therefore, at step S3, the amplitude level A of the input voltage $V_{in}$ that is measured by the AC voltage detector 35 is almost zero and is smaller than the predetermined threshold value $A_{th}$ (NO at step S3). The CPU 13 determines that no contactors are welded (at step S5). The CPU 13 outputs display information to the display output part 38 to notify the operator of whether or not the welding of the contactors occurs, depending on the results of the welding detection at steps S4 and S5 (at step S6).

Figure 5:
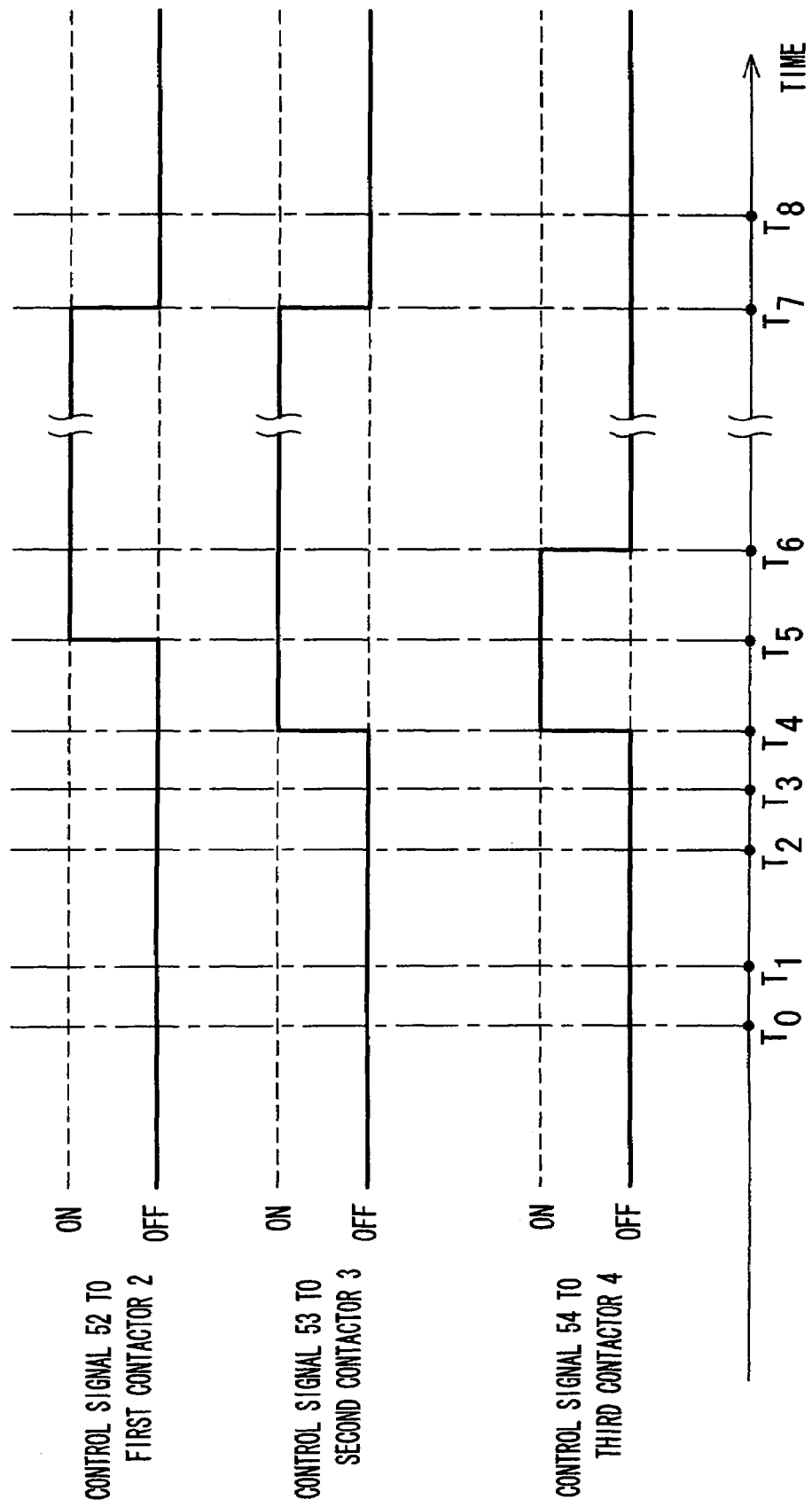
FIG. 5 is a timing chart showing a process for welding detection in accordance with the first preferred embodiment of the present invention.

FIG. 5 is a timing chart showing control signals 52, 53 and 54 from the controller 20 to the first contactor 2, the second contactor 3, and the third contactor 4, respectively, in the power supply controller apparatus in accordance with the first preferred embodiment of the present invention. In addition, timings $T_O$ to $T_8$ on the horizontal axis of FIG. 5 are located at the same positions as those in FIG. 15 of the prior art for comparison.

At the timing $T_O$, the operator of the electric vehicle turns on the ignition key of the operation input part 36 to supply the power. Since contactors 2, 3 and 4 are all controlled to be turned off, the controller outputs the AC voltage $V_{AC}$ at the predetermined frequency to detect welding of the contactors at this timing.

At the timing $T_4$, the second contactor 3 and the third contactor 4 are controlled to be turned on. The precharge of the capacitor 6 is started. At this timing, since the current-limiting resistance 5 is provided, no large-current flows between the contacts of the third contactor 4.

At the timing $T_5$ when the capacitor 6 is fully charged, the first contactor 2 is controlled to be turned on, and then the voltage of the battery assembly 1 is applied to the inverter 32 so as to start driving of the motor 34. At the timing $T_6$, the third contactor 4 is controlled to be turned off.

Further, at the timing $T_7$, the operator of the electric vehicle turns off the ignition key. At the same time, the first contactor 2 and the second contactor 3 are controlled to be turned off to stop driving of the motor.

The power supply controller apparatus in accordance with the first preferred embodiment of the present invention is not required to switch over the third contactor 4 during the time interval between the timings $T_1$ and $T_2$ for the purpose of the welding detection of the second contactor 3. Namely, the number of switching time of the third contactor 4 of FIG. 5 is smaller than that of FIG. 15. Therefore, since the power supply controller apparatus in accordance with the first preferred embodiment of the present invention prevents reduction of the duration life of the third contactor 4, the power supply controller apparatus in accordance with the first preferred embodiment is longer in its service life than that of the prior art.

Additionally, since the power supply controller apparatus in accordance with the first preferred embodiment of the present invention is not required to use an inverter voltage for the welding detection, circuits and wire harnesses for measuring the inverter voltage are not required, and as a result, the power supply controller apparatus in accordance with the first preferred embodiment of the present invention is low in cost.

Furthermore, since the power supply controller apparatus in accordance with the first preferred embodiment of the present invention is not required to communicate with an external unit in the case that the inverter voltage is measured by a unit at the outside of the power supply controller apparatus, the power supply controller apparatus in accordance with the first preferred embodiment of the present invention is able to execute the welding detection of the contactors in shorter time.

Still further, since the power supply controller apparatus in accordance with the first preferred embodiment of the present invention is not required to control the only first contactor 2 to be turned off during the time interval between the timings $T_7$ and $T_8$ for the purpose of the welding detection of the first contactor 2 after the operator turns off the ignition key, the electric charge in the capacitor 6 is not required to be discharged. Therefore, the power supply controller apparatus in accordance with the first preferred embodiment of the present invention allows itself to shorten the time required for the welding detection. No additional load for discharging the electric charge is required.

Figure 6:
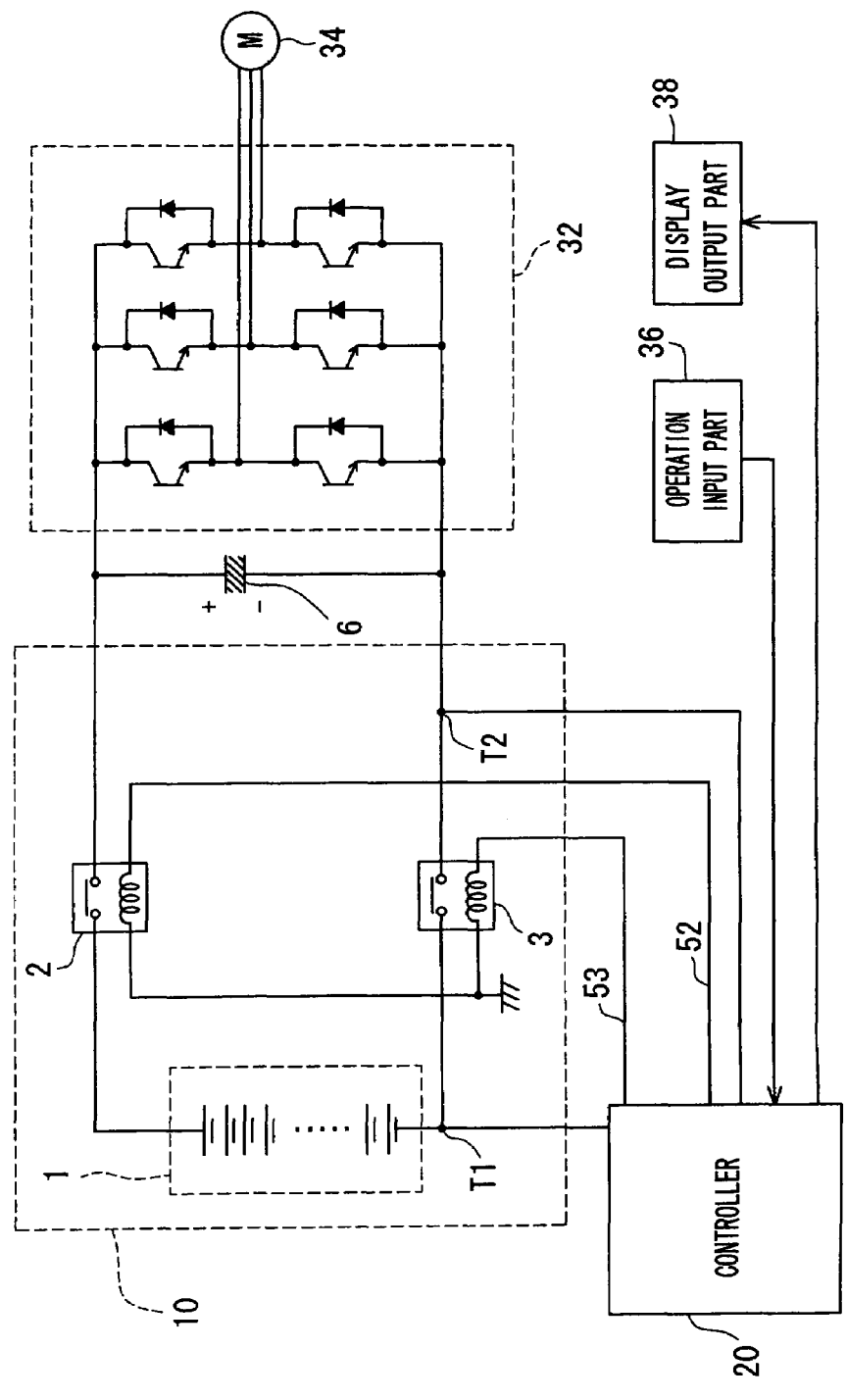
FIG. 6 is a block diagram showing another configuration of an electric vehicle having the power supply controller apparatus in accordance with the first preferred embodiment of the present invention.

The power supply controller apparatus in accordance with the first preferred embodiment of the present invention has a configuration having three contactors as shown in FIG. 1. However, without being limited to this, the present invention may have a configuration having only two contactors as shown in FIG. 6, in particular, a configuration getting off the third contactor 4 for precharge and the current-limiting resistance 5 from the configuration shown in FIG. 1. In this case, the precharge operation of the capacitor 6 is not executed. Therefore, it is only necessary that the first contactor 2 and the second contactor 3 be controlled to be turned on at the activation of the pure electric vehicle after checking whether or not the capacitor 6 is sufficiently charged or after fully charging the capacitor 6 using means for charging the capacitor 6. In accordance with this configuration, the welding of the first contactor 2 and the second contactor 3 can be detected at low cost and in short amount of time.

Second Preferred Embodiment

Figure 7:
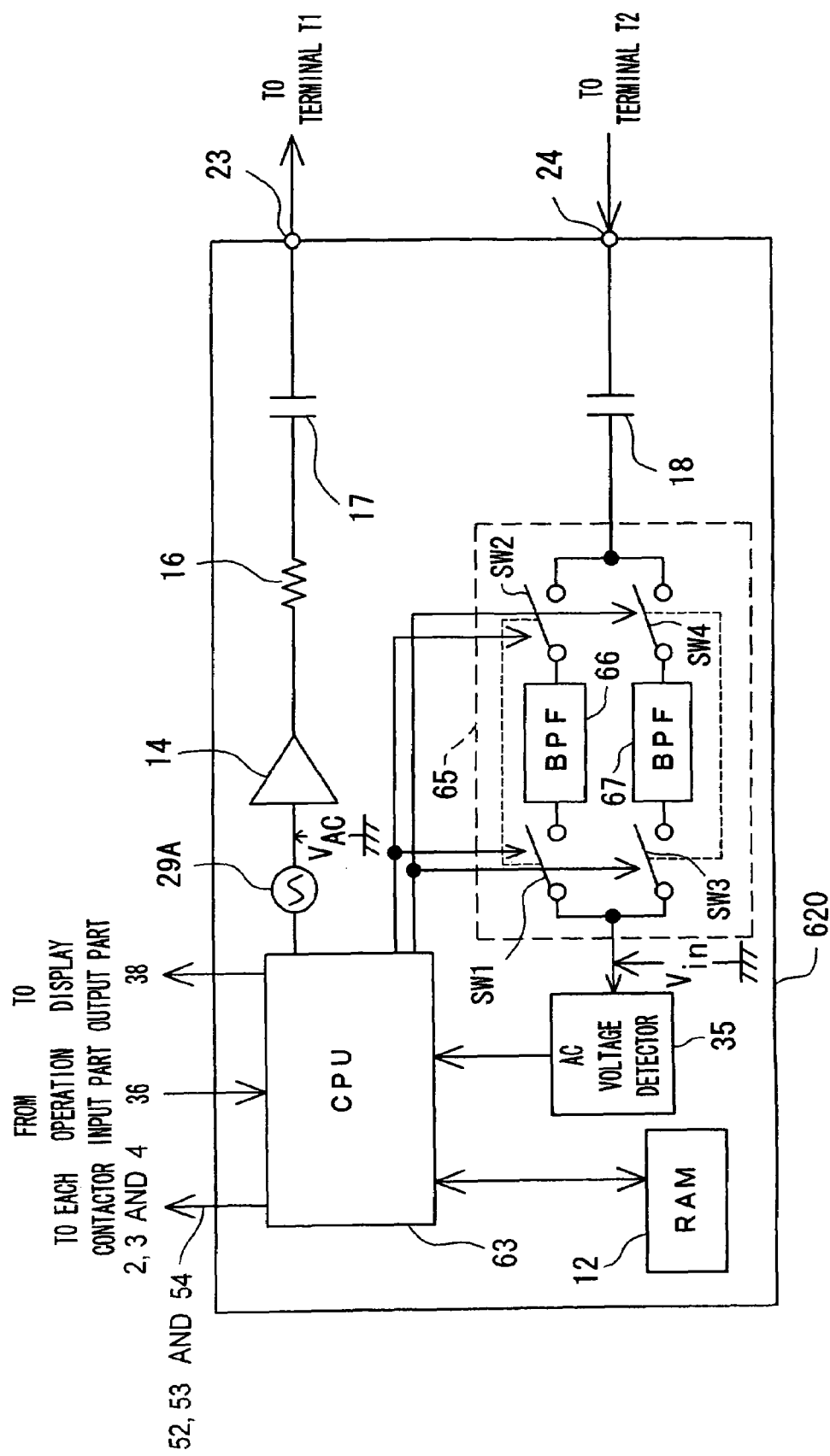
FIG. 7 is a block diagram showing a detailed configuration of a controller 620 in accordance with a second preferred embodiment of the present invention.
Figure 8:
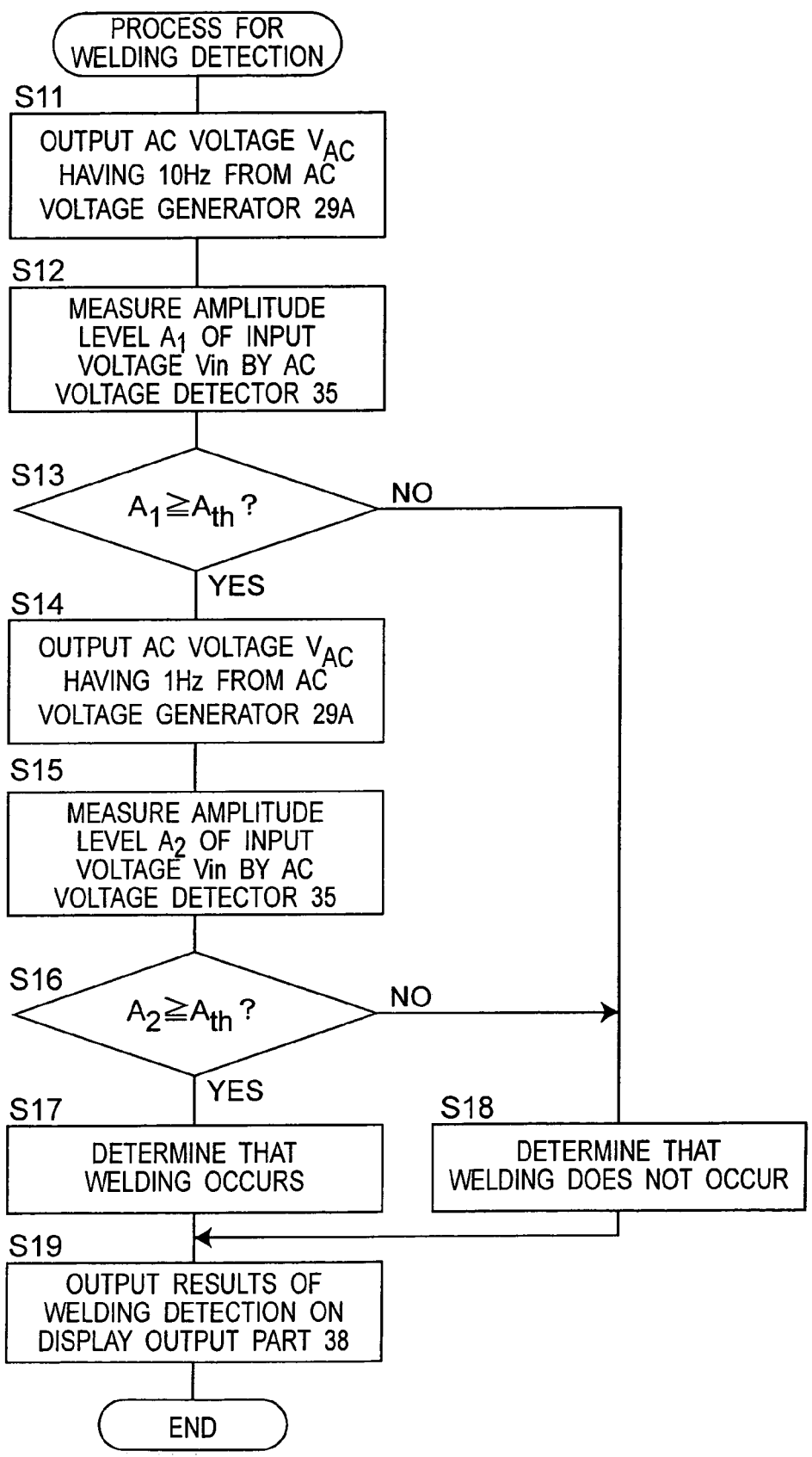
FIG. 8 is a flow chart showing a process for welding detection in accordance with the second preferred embodiment of the present invention.

Referring to FIG. 7 and FIG. 8, the power supply controller apparatus in accordance with the second preferred embodiment of the present invention will be described. The power supply controller apparatus in accordance with the second preferred embodiment of the present invention is different from the first preferred embodiment in that the power supply controller apparatus includes a controller 620 instead of the controller 20 of the first preferred embodiment shown in FIG. 1. FIG. 7 is a block diagram showing a detailed configuration of the controller 620 in accordance with the second preferred embodiment of the present invention. The controller 620 includes a BPF circuit 65 instead of the BPF 15 of the controller 20 of the first preferred embodiment shown in FIG. 2, a CPU 63 instead of the CPU 13, and an AC voltage generator 29A instead of the AC voltage generator 29. In other respects, the configuration is similar to that of the first preferred embodiment. Components similar or equivalent to those of the first preferred embodiment are designated by the same numeral references, and their descriptions are omitted.

A digital signal from the CPU 63, which indicates a frequency and a voltage, is inputted to the AC voltage generator 29A. The AC voltage generator 29A, responsive to the digital signal, generates and outputs a sinusoidal AC voltage $V_{AC}$ (e.g. 5V) having a predetermined frequency indicated by the digital signal. The AC voltage generator 29A selectively generates and outputs the AC voltage $V_{AC}$ having one of two frequencies depending on the digital signal. The two frequencies are, for example, 1 Hz and 10 Hz. The AC voltage detector 35 measures the amplitude level of the input voltage $V_{in}$ inputted from the BPF 65, and outputs the amplitude level A to the CPU 63.

The CPU 63 such as a microcomputer or the like stores a program for executing a process for instructing the AC voltage generator 29A to output the AC voltage $V_{AC}$, a process for determining whether or not any contactor is welded depending on the amplitude level of the input voltage $V_{in}$ measured by the AC voltage detector 35, a process for the input signals from the operation input part 36, a process for controlling the contactors 2, 3 and 4 and the display output part 38, etc. The CPU 63 receives an input signal from the operation input part 36, and controls respective contactors 2, 3 and 4. The CPU 63 changes the cutoff frequencies of the BPF circuit 65 depending on a selected frequency of the two frequencies mentioned above. The CPU 63 executes the welding detection of the contactors 2, 3 and 4 at a predetermined timing. If the CPU 63 determines that any contactor is welded, the CPU 63 outputs display information for notifying the operator of incidence of the welding to the display output part 38, to display the same information thereon.

The BPF circuit 65 includes a BPF 66, a BPF 67, and switches SW1, SW2, SW3, and SW4. The BPF 66 at least passes therethrough the signal having a frequency of 1 Hz. The BPF 67 at least passes therethrough the signal having a frequency of 10 Hz.

The CPU 63 controls the switches SW1, SW2, SW3, and SW4 of the BPF circuit 65 to select the BPF 66 or the BPF 67. That is, the CPU 63, in the case that the AC voltage generator 29A outputs the AC voltage $V_{AC}$ having a frequency of 1 Hz, controls the switches SW1 and SW2 to be turned on and the switches SW3 and SW4 to be turned off so that the signals pass through the BPF 66. On the contrary, the CPU 63, in the case that the AC voltage generator 29A outputs the AC voltage $V_{AC}$ having a frequency of 10 Hz, controls the switches SW1 and SW2 to be turned off and controls the switches SW3 and SW4 to be turned on so that the signals pass through the BPF 67.

The BPF 66 and the BPF 67 filter out noise included in the voltage signal that is inputted through the second coupling capacitor 18.

Referring to FIG. 8, the operation of the power supply controller apparatus in accordance with the second preferred embodiment of the present invention in the case that any one of the first contactor 2, the second contactor 3, and the third contactor 4 is welded will be described below. FIG. 8 is a flow chart showing a process for the welding detection in accordance with the second preferred embodiment of the present invention.

The driver of the electric vehicle turns on the ignition key of the operation input part 36 to supply the power before the CPU 63 executes the welding detection at the timing when the first contactor 2, the second contactor 3, and the third contactor 4 are all controlled to be turned off. The CPU 63 instructs the AC voltage generator 29A to output an AC voltage $V_{AC}$ (a sinusoidal wave) having a higher frequency (e.g. 10 Hz) (at step S11). At this timing, the CPU 63 controls the switches SW1 and SW2 to be turned off and the switches SW3 and SW4 to be turned on to select the BPF 67. The AC voltage $V_{AC}$ from the AC voltage generator 29A is inputted to the input terminal T1 of FIG. 1 through the buffer circuit 14, the output impedance 16, and the first coupling capacitor 17. Since each current application path in the case that each contactor is welded is described in detail in the first preferred embodiment, its description is omitted.

The AC voltage detector 35 measures the amplitude level $A_1$ of the input voltage $V_{in}$ inputted from the BPF circuit 65 (at step S12). The CPU 63 checks whether or not the amplitude level $A_{th}$, is equal to or larger than the predetermined threshold value $A_{th}$, which is read out from the RAM 12 (at step S13). In the case that the amplitude level $A_1$ is less than the predetermined threshold value $A_{th}$ (NO at step S13), the CPU 63 determines that no contactors are welded (at step S18).

At the step S13, in the case that the amplitude level $A_1$ is equal to or larger than the predetermined threshold value $A_{th}$ (YES at step S13), the CPU 63 determines that any one of the first contactor 2, the second contactor 3, and the third contactor 4 might be welded. The CPU 63 then instructs the AC voltage generator 29A to output an AC voltage $V_{AC}$ having a low frequency (e.g. 1 Hz) (at step S14). At this timing, the CPU 63 controls the switches SW1 and SW2 to be turned on and the switches SW3 and SW4 to be turned off to select the BPF 66. The AC voltage $V_{AC}$ from the AC voltage generator 29A is inputted to the input terminal T1 of FIG. 1 through the buffer circuit 14, the output impedance 16, and the first coupling capacitor 17.

The AC voltage detector 35 measures the amplitude level $A_2$ of the input voltage $V_{in}$ inputted from the BPF circuit 65 (at step S15). The CPU 63 checks whether or not the amplitude level $A_2$ is equal to or larger than the predetermined threshold value $A_{th}$, which is read out from the RAM 12 (at step S16). In the case that the amplitude level $A_2$ is less than the predetermined threshold value $A_{th}$ (NO at step S16), the CPU 63 determines that no contactors are welded (at step S18).

At the step S16, in the case that the amplitude level A2 is equal to or larger than the predetermined threshold value $A_{th}$ (YES at step S16), the CPU 63 determines that any one of the first contactor 2, the second contactor 3, and the third contactor 4 is welded (at step S17).

The CPU 63 outputs display information or a sound signal on the display output part 38 to notify the operator of incidence of the welding, depending on the results of the welding detection at steps S17 and S18 (at step S19).

In the power supply controller apparatus in accordance with the second preferred embodiment of the present invention, the time required to execute the welding detection can be reduced in the case that no contactors are welded. The AC voltage $V_{AC}$ having a higher frequency is outputted first, and then in the case that the amplitude level of the input voltage $V_{in}$ is equal to or larger than the predetermined threshold, the AC voltage $V_{AC}$ having a low frequency is outputted so as to avoid an erroneous decision due to the effect of noise. This leads to that the power supply controller apparatus in accordance with the second preferred embodiment of the present invention allows a welding detection with higher accuracy than that of the prior art.

In the power supply controller apparatus in accordance with the second preferred embodiment of the present invention, two frequencies are switched depending on the degree of noise or the timing to detect welding for optimum welding detection of contactors. The higher the frequency is, the shorter the time required to detect welding becomes, but noise more easily influences the power supply controller apparatus. For example, the power supply controller apparatus can select a high frequency at the activation to reduce the waiting time of users, and select a low frequency upon the termination. In accordance with the present invention, the power supply controller apparatus that executes the welding detection of contactors in shorter time can be realized.

In addition, in the second preferred embodiment of the present invention, the controller 620 switches over between two frequencies of the AC voltage $V_AC$, 1 Hz and 10 Hz. However, without being limited to this, the controller 620 may switch over among a plurality of frequencies of more than three, or may vary the frequency continuously.

Furthermore, the BPF circuit 65 includes a BPF 66 that at least passes the signal having a frequency of 1 Hz and a BPF 67 that at least passes the signal having a frequency of 10 Hz, and has such a configuration that the BPF 66 and the BPF 67 are switched under control of the CPU 63. However, instead of this, the BPF circuit 65 having a configuration in which one BPF switches over between one cutoff frequency that at least passes the signal having a frequency of 1 Hz and another cutoff frequency that at least passes the signal having a frequency of 10 Hz brings the same advantageous effects as those of the second preferred embodiment.

Third Preferred Embodiment

Figure 9:
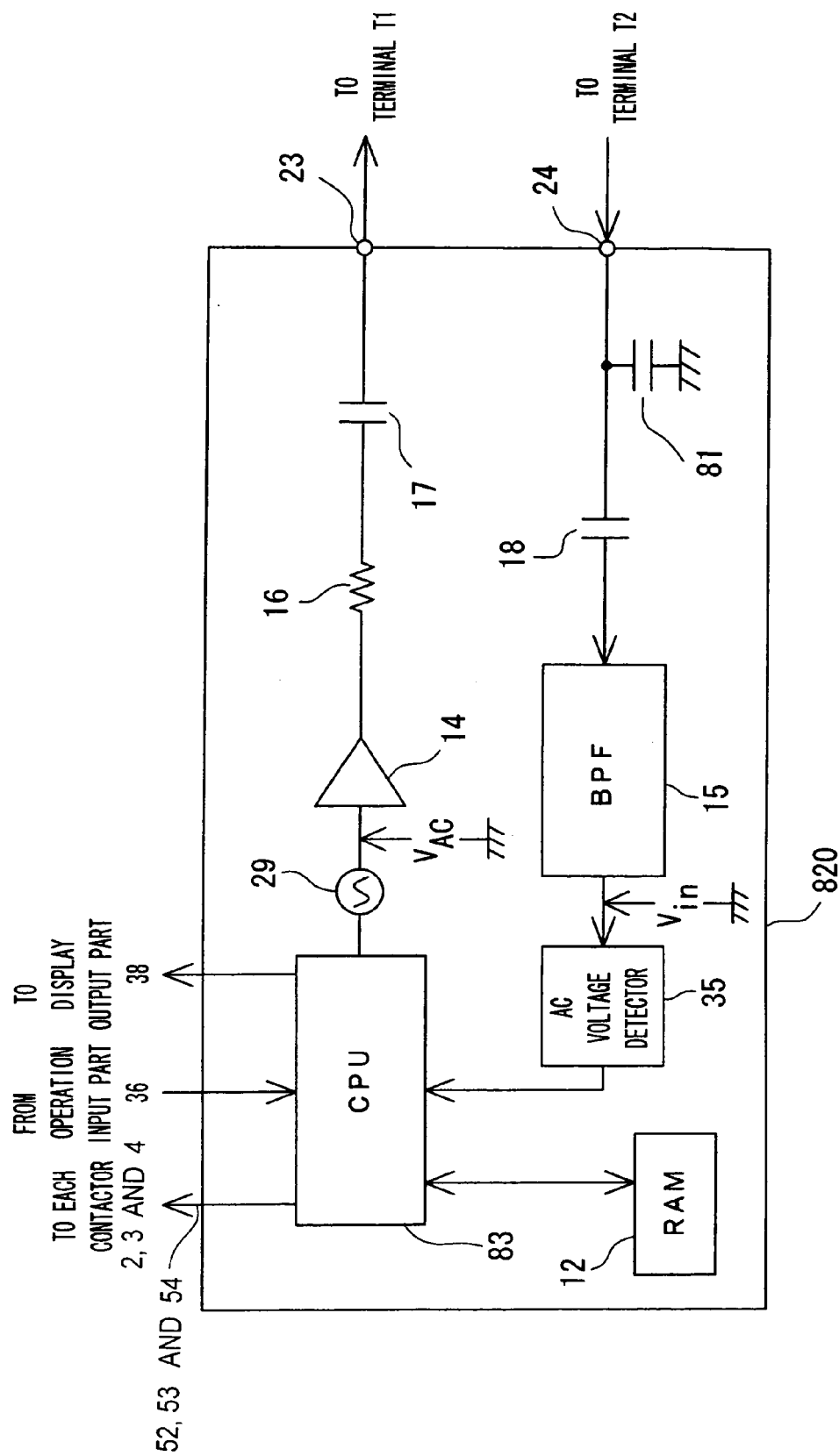
FIG. 9 is a block diagram showing a detailed configuration of a controller 820 in accordance with a third preferred embodiment of the present invention.
Figure 10:
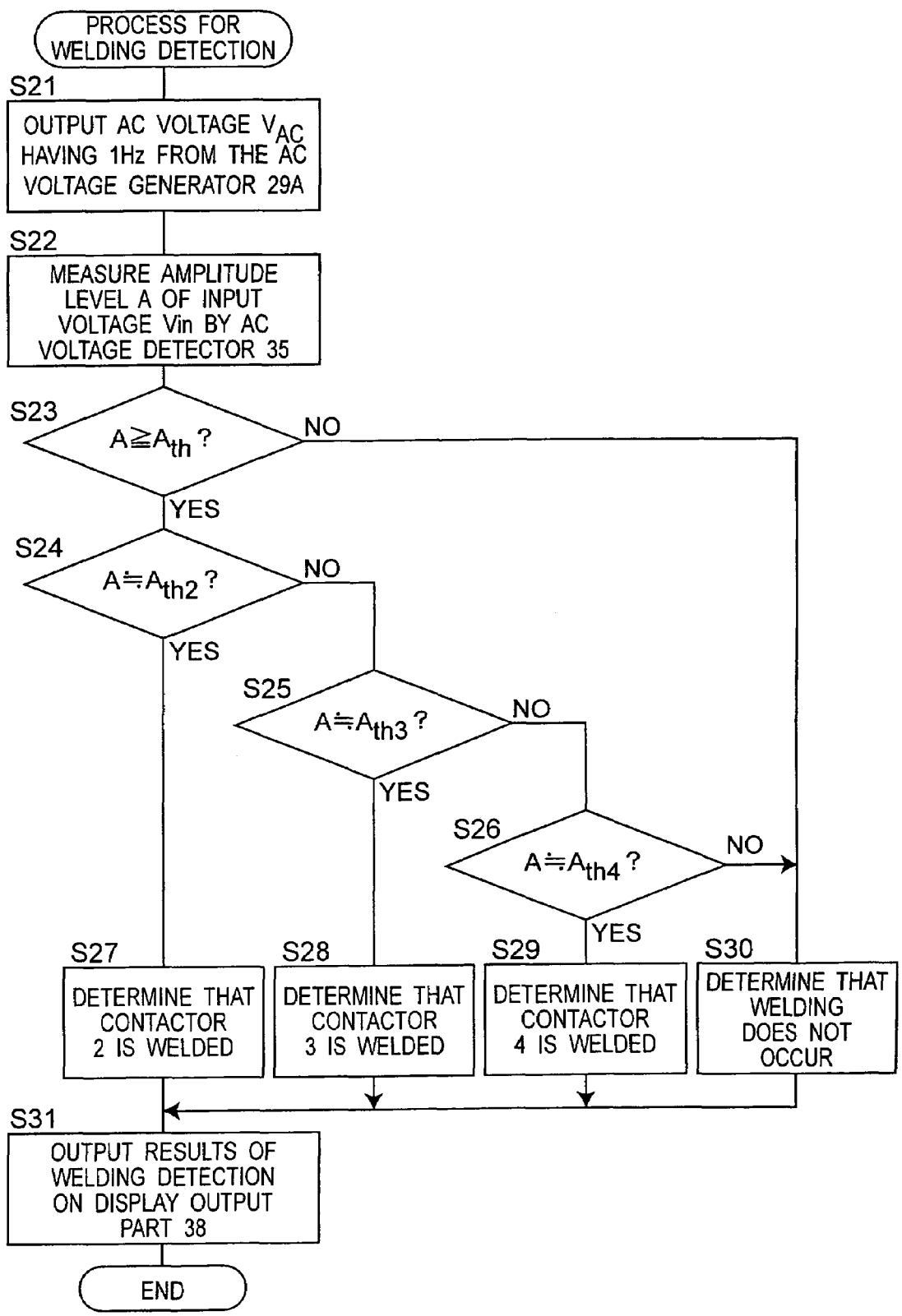
FIG. 10 is a flow chart showing a process for welding detection in accordance with the third preferred embodiment of the present invention.

Referring to FIG. 9 and FIG. 10, the power supply controller apparatus in accordance with the third preferred embodiment of the present invention will be described. The power supply controller apparatus in accordance with the third preferred embodiment of the present invention is different from the first preferred embodiment in that the power supply controller apparatus includes a controller 820 instead of the controller 20 of the first preferred embodiment shown in FIG. 1. FIG. 9 is a block diagram showing a detailed configuration of the controller 820 in accordance with the third preferred embodiment of the present invention. The controller 820 includes a CPU 83 instead of the CPU 13 of the controller 20 of the first preferred embodiment shown in FIG. 2, and further includes a capacitor 81 for determining the welded contactor in addition to the configuration of the controller 20 of the first preferred embodiment. The method for welding detection of the CPU 83 is different from that of the CPU 13. In other respects, the configuration is similar to that of the first preferred embodiment. Components similar or equivalent to those of the first preferred embodiment are designated by the same numeral references, and their descriptions are omitted.

The capacitor 81 for determining the welded contactor is an impedance element connecting the connection point between the second terminal 24 and the second coupling capacitor 18 and a ground potential.

Referring to FIG. 10, the operation of the power supply controller apparatus in accordance with the third preferred embodiment of the present invention in the case that any one of the first contactor 2, the second contactor 3, and the third contactor 4 is welded will be described below. FIG. 10 is a flow chart showing a process for the welding detection in accordance with the third preferred embodiment of the present invention.

The driver of the electric vehicle turns on the ignition key of the operation input part 36 to supply the power before the CPU 83 executes the welding detection at the timing when the first contactor 2, the second contactor 3, and the third contactor 4 are all controlled to be turned off. The CPU 83 instructs the AC voltage generator 29 to output an AC voltage $V_{AC}$ (a sinusoidal wave) having a predetermined frequency (at step S21). The AC voltage $V_{AC}$ from the AC voltage generator 29 is inputted to the input terminal T1 of FIG. 1 through the buffer circuit 14, the output impedance 16, and the first coupling capacitor 17.

In the case that the first contactor 2 is welded, the AC voltage $V_{AC}$ from the AC voltage generator 29 is inputted to the AC voltage detector 35 through a connection circuit constituted by the buffer circuit 14, the output impedance 16, the first coupling capacitor 17, the battery assembly 1, the first contactor 2, the capacitor 6, the second coupling capacitor 18, and the BPF 15 (note that the connection circuit includes a branch of the capacitor 81 for determining the welded contactor that earths the connection point between the second terminal 24 and the second coupling capacitor 18). At this timing, the amplitude level $A_{th2}$ of the input voltage $V_{in}$ detected by the AC voltage detector 35 is represented as the following equation (1).

In addition, in the following equations, an impedance of the series circuit constituted by the output impedance 16 and the first coupling capacitor 17 is denoted as $Z_1$. An impedance of the capacitor 81 for determining the welded contactor is denoted as $Z_2$. An impedance of the capacitor 6 is denoted as $Z_3$. The resistance value of the current-limiting resistance 5 is denotes as R. The load impedance of the inverter 32 and the motor 34 is much larger than these impedances.

$$A_{th2} = \{Z_2/(Z_1+Z_2+Z_3)\}V_{AC} \qquad (1)$$

In the case that the second contactor 3 is welded, the AC voltage $V_{AC}$ from the AC voltage generator 29 is inputted to the AC voltage detector 35 through a connection circuit constituted by the buffer circuit 14, the output impedance 16, the first coupling capacitor 17, the second contactor 3, the second coupling capacitor 18, and the BPF 15 (note that the connection circuit includes a branch of the capacitor 81 for determining the welded contactor that earths the connection point between the second terminal 24 and the second coupling capacitor 18). At this timing, the amplitude level $A_{th3}$ of the input voltage $V_{in}$ detected by the AC voltage detector 35 is represented as the following equation (2).

$$A_{th3} = \{Z_2/(Z_1+Z_2)\}V_{AC} \qquad (2)$$

In the case that the third contactor 4 is welded, the AC voltage $V_{AC}$ from the AC voltage generator 29 is inputted to the AC voltage detector 35 through a connection circuit constituted by the buffer circuit 14, the output impedance 16, the first coupling capacitor 17, the battery assembly 1, the third contactor 4, the current-limiting resistance 5, the capacitor 6, the second coupling capacitor 18, and the BPF 15 (note that the connection circuit includes a branch of the capacitor 81 for determining the welded contactor that earths the connection point between the second terminal 24 and the second coupling capacitor 18). At this timing, the amplitude level $A_{th4}$ of the input voltage $V_{in}$ detected by the AC voltage detector 35 is represented as the following equation (3).

$$A_{th4} = \{Z_2/(Z_1+Z_2+Z_3+R)\}V_{AC} \qquad (3)$$

In the above equations (1), (2) and (3), the impedance values $Z_1$, $Z_2$, $Z_3$ and the resistance value R of the current-limiting resistance 5 are preliminarily decided so that the amplitude levels $A_{th2}$, $A_{th3}$, and $A_{th4}$ are different from each other.

The AC voltage detector 35 measures the amplitude level A of the input voltage $V_{in}$ inputted from the BPF 15 (at step S22). The CPU 83 checks whether or not the amplitude level A is equal to or larger than the predetermined threshold value $A_{th}$, which is read out from the RAM 12 (at step S23). In the case that each contactor is welded as described above, since the AC voltage $V_{AC}$ from the AC voltage generator 29 is returned to the second terminal 24, the amplitude level A is equal to or larger than the predetermined threshold value $A_{th}$ (YES at step 23). In the case that the amplitude level A is less than the predetermined threshold value $A_{th}$ (NO at step 23), the CPU 83 determines that no contactors are welded (at step S30).

The amplitude levels $A_{th2}$, $A_{th3}$, and $A_{th4}$ measured by the AC voltage detector 35 are different from each other according to which contactor is welded. The CPU 83 determines which contactor of the first contactor 2, the second contactor 3, and the third contactor 4 is welded using these amplitude differences. That is, in the case that the amplitude level A is equal to or larger than the predetermined threshold value $A_{th}$ at step S23, the CPU 83 checks whether or not the measured amplitude level A is nearly equal to the amplitude level $A_{th2}$ obtained from the above equation (1) (at step S24). In the case that the amplitude level A is nearly equal to the amplitude level $A_{th2}$ (YES at step 24), the CPU 83 determines that the first contactor 2 is welded (at step S27). If this is not the case (NO at step 24), the CPU 83 then checks whether or not the measured amplitude level A is nearly equal to the amplitude level $A_{th3}$ obtained from the above equation (2) (at step S25). In the case that the amplitude level A is nearly equal to the amplitude level $A_{th3}$ (YES at step 25), the CPU 83 determines that the second contactor 3 is welded (at step S28). If this is not the case (NO at step 25), the CPU 83 then checks whether or not the measured amplitude level A is nearly equal to the amplitude level $A_{th4}$ obtained from the above equation (3) (at step S26). In the case that the amplitude level A is nearly equal to the amplitude level $A_{th4}$ (YES at step 26), the CPU 83 determines that the third contactor 4 is welded (at step S29). If this is not the case (NO at step 26), the CPU 83 determines that no contactors are welded (at step S30).

In the configuration described above, in the case that the two or more contactors are welded, the welding of any one contactor included in a path having smaller impedance value is detected. For example, in the case that both the first contactor 2 and the second contactor 3 are welded, the welding of the second contactor 3 is detected. In the case that both the second contactor 3 and the third contactor 4 are welded, the welding of the second contactor 3 is detected. In the case that both the first contactor 2 and the third contactor 4 are welded, the welding of the first contactor 1 is detected. In the case that the first contactor 2, the second contactor 3, and the third contactor 4 are all welded, the welding of the second contactor 3 is detected.

The CPU 83 outputs display information or a sound signal on the display output part 38 to notify the operator of incidence of the welding and/or the welded contactor if the welding occurs, depending on the results of the welding detection at steps S27 to S30 (at step S31).

In the power supply controller apparatus in accordance with the third preferred embodiment of the present invention, in the case that any contactor is welded, the amplitude level A of the input voltage $V_{in}$ measured by the AC voltage detector 35 is different from each other depending on the welded contactor. The CPU 83 compares the amplitude level A and the amplitude levels $A_{th2}$, $A_{th3}$, and $A_{th4}$ obtained from the equations (1), (2) and (3), respectively, and as a result, the welded contactor can be specified. In accordance with the present invention, the power supply controller apparatus that can execute the welding detection with higher accuracy can be realized.

In the third preferred embodiment of the present invention, the capacitor 81 for determining the welded contactor is used in order to specify the welded contactor. However, without being limited to this, a resistance instead of the capacitor brings the same advantageous effect as that of the third preferred embodiment.

The third preferred embodiment of the present invention was described with taking the configuration in which the capacitor 81 for determining the welded contactor is added to the controller 20 in the first preferred embodiment as one example. However, without being limited to this, the configuration where the capacitor 81 for determining the welded contactor is added to the controller 620 of the second preferred embodiment brings the same advantageous effect as that of the third preferred embodiment.

In the third preferred embodiment of the present invention, the second terminal 24 of the controller 820 may be connected to one end of the opposite side to the battery assembly 1 of the parallel circuit, which is constituted by the first contactor 2 and the series circuit constituted by the third contactor 4 and the current-limiting resistance 5 instead of the output terminal T2 of FIG. 1. In that case, the current application paths are different from each other depending on which contactor of the first contactor 2, the second contactor 3, and the third contactor 4 is welded. That is, it is only necessary to use following equations (4), (5) and (6) instead of the above equations (1), (2) and (3):

$$A_{th2} = \{Z_2/(Z_1+Z_2)\}V_{AC} \quad (4),$$

$$A_{th3} = \{Z_2/(Z_1+Z_2+Z_3)\}V_{AC} \quad (5), \text{ and}$$

$$A_{th4} = \{Z_2/(Z_1+Z_2+R)\}V_{AC} \quad (6).$$

In this case, the welded contactor can be specified by comparing the amplitude level A and the amplitude levels $A_{th2}$, $A_{th3}$, and $A_{th4}$ obtained by the equations (4), (5) and (6), respectively, in a way similar to that as mentioned above.

Fourth Preferred Embodiment

Figure 11:
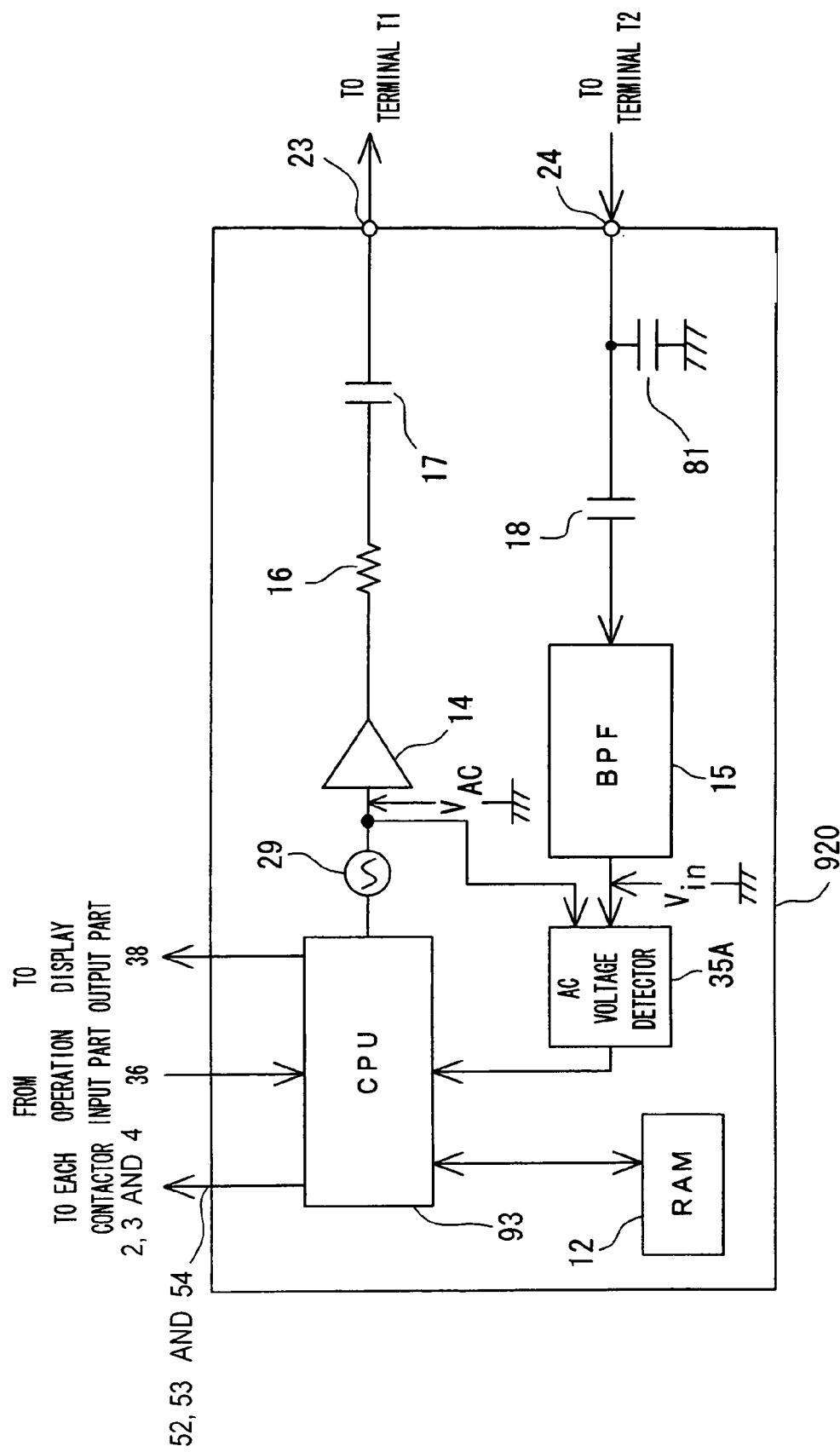
FIG. 11 is a block diagram showing a detailed configuration of a controller 920 in accordance with a fourth preferred embodiment of the present invention.
Figure 12:
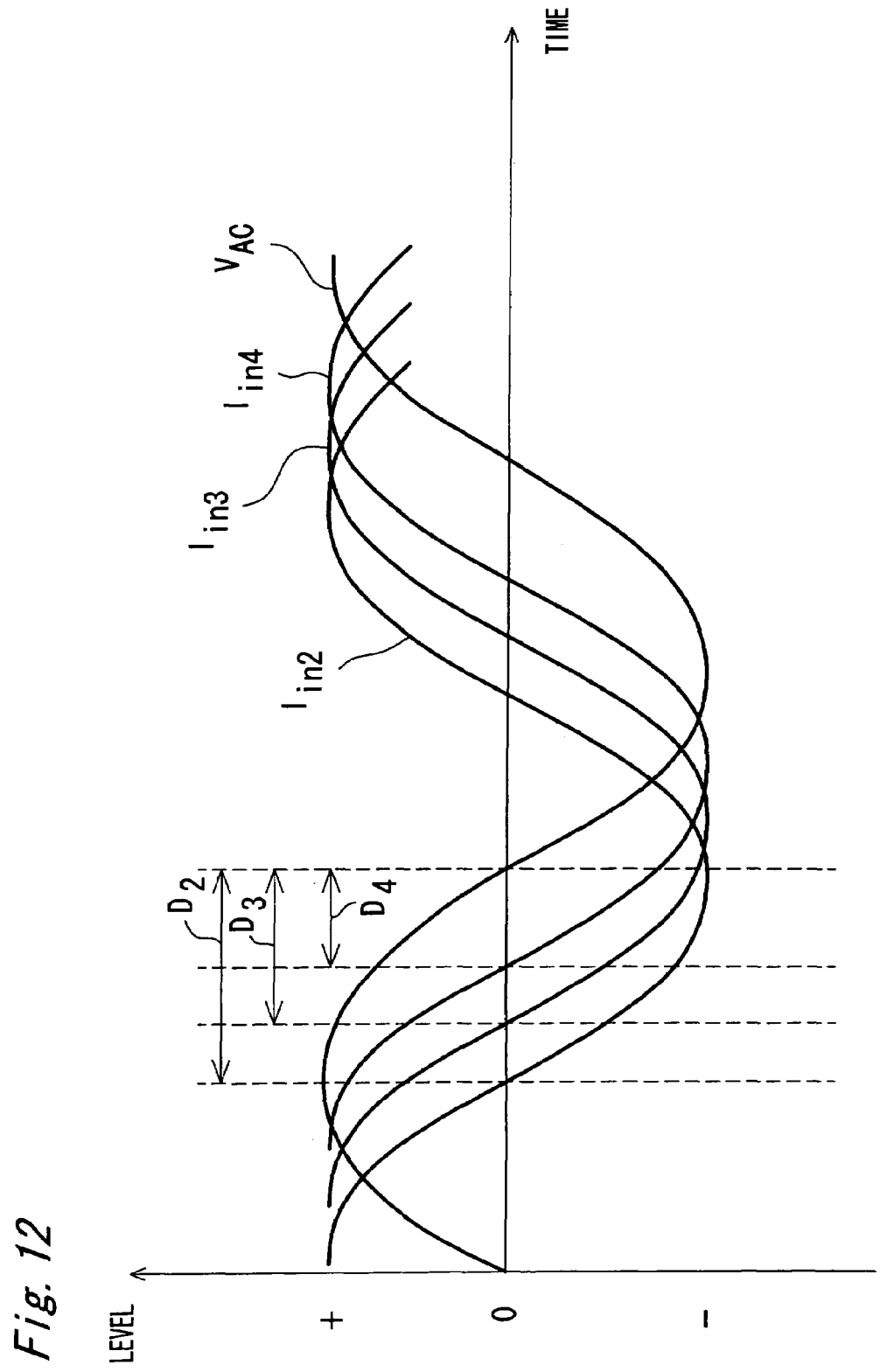
FIG. 12 is a waveform chart showing a relationship among a voltage signal and current signals for welding detection in accordance with the fourth preferred embodiment of the present invention.

Referring to FIG. 11 and FIG. 12, the power supply controller apparatus in accordance with the fourth preferred embodiment of the present invention will be described. The power supply controller apparatus in accordance with the fourth preferred embodiment of the present invention is different from the third preferred embodiment in that the power supply controller apparatus includes a controller 920 instead of the controller 820 of the third preferred embodiment shown in FIG. 9. FIG. 11 is a block diagram showing a detailed configuration of the controller 920 in accordance with the fourth preferred embodiment of the present invention. The controller 920 includes a CPU 93 instead of the CPU 83 of the controller 820 of the third preferred embodiment shown in FIG. 9, and an AC voltage detector 35A instead of the AC voltage detector 35. The method for welding detection of the CPU 93 is different from that of the CPU 83. In other respects, the configuration is similar to that of the third preferred embodiment. Components similar or equivalent to those of the third preferred embodiment are designated by the same numeral references, and their descriptions are omitted.

The AC voltage detector 35A measures the phase difference D between the phase of the AC voltage $V_{AC}$ from the AC voltage generator 29 and the phase of the AC current corresponding to the AC voltage $V_{in}$ inputted from the BPF 15 as well as the amplitude level A of the input voltage $V_{in}$. The inventors focus their attention on that each current application path is different from each other depending on the welded contactor. The power supply controller apparatus in accordance with the fourth preferred embodiment of the present invention utilizes that the phase of the current signal is shifted from the phase of the voltage signal applied first due to the impedance elements in which a current flows, such as an inductance and a capacitor or the like.

Referring to FIG. 12, the method for the welding detection of the controller 920 in the case that any one of the first contactor 2, the second contactor 3, and the third contactor 4 is welded will be described below. FIG. 12 is a diagram showing an AC voltage (sinusoidal wave) $V_{AC}$ from the AC voltage generator 29, and input AC currents $I_{in2}$, $I_{in3}$, and $I_{in4}$ corresponding to each input voltage $V_{in}$ inputted to the AC voltage detector 35A in the case that respective contactors 2, 3 and 4 are welded. In addition, the input AC currents $I_{in2}$, $I_{in3}$, and $I_{in4}$ are derived based on each input voltage $V_{in}$ in the case that any one of the first contactor 2, the second contactor 3, and the third contactor 4 is welded.

The driver of the electric vehicle turns on the ignition key of the operation input part 36 to supply the power before the CPU 93 executes the welding detection at the timing when the first contactor 2, the second contactor 3, and the third contactor 4 are all controlled to be turned off. The CPU 93 instructs the AC voltage generator 29 to output an AC voltage $V_{AC}$ having a predetermined frequency.

In the case that the first contactor 2 is welded, the current generated by the application of the AC voltage $V_{AC}$ passes the output impedance 16, the first coupling capacitor 17, the capacitor 6, the second coupling capacitor 18, and the capacitor 81 for determining the welded contactor on its application path. Therefore, the phase of the AC current $I_{in2}$ is shifted from the phase of the AC voltage $V_{AC}$ by the phase difference $D_2$ depending on the impedance elements on the current application path changing depending on the welded contactor. Additionally, in the case that the second contactor 3 is welded, the current generated by the application of the AC voltage $V_{AC}$ passes the output impedance 16, the first coupling capacitor 17, the second coupling capacitor 18, and the capacitor 81 for determining the welded contactor on its application path. Therefore, the phase of the AC current $I_{in3}$ is shifted from the phase of the AC voltage $V_{AC}$ by the phase difference $D_3$ depending on the impedance elements on the current application path changing depending on the welded contactor. Furthermore, in the case that the third contactor 4 is welded, the current generated by the application of the AC voltage $V_{AC}$ passes the output impedance 16, the first coupling capacitor 17, the current-limiting resistance 5, the capacitor 6, the second coupling capacitor 18, and the capacitor 81 for determining the welded contactor on its application path. Therefore, the phase of the AC current $I_{in4}$ is shifted from the phase of the AC voltage $V_{AC}$ by the phase difference $D_4$ depending on the impedance elements on the current application path changing depending on the welded contactor.

In addition, a detailed description regarding the measurement of the amplitude level A of the input voltage $V_{in}$ in the case that each contactor is welded and the comparison between the amplitude level A and the amplitude levels $A_{th2}$, $A_{th3}$ and $A_{th4}$ obtained from the above equations (1), (2), and (3), respectively, is contained in the third preferred embodiment, and therefore, their descriptions are omitted.

As described above, the impedance elements, in which the current signal generated by the application of the AC voltage $V_{AC}$ passes, are different from each other depending on the welded contactor. That is, the phase differences $D_2$, $D_3$ and $D_4$ measured by the AC voltage detector 35A are different from each other depending on the welded contactor.

The CPU 93 compares the phase difference D between the phase of the AC voltage $V_{AC}$ from the AC voltage generator 29 and the phase of the current signal corresponding to the input voltage $V_{in}$ inputted from the BPF 15 with the above phase differences $D_2$, $D_3$ and $D_4$, respectively, in addition to comparing the measured amplitude level A of the input voltage $V_{in}$ with the amplitude levels $A_{th2}$, $A_{th3}$ and $A_{th4}$ obtained from the above equations (1), (2), and (3), respectively. Then the CPU 93 determines which contactor of the first contactor 2, the second contactor 3, and the third contactor 4 is welded. The CPU 93 outputs display information or a sound signal on the display output part 38 to notify the operator of incidence of the welding and/or the welded contactor if the welding occurs, depending on the results of the welding detection. In the power supply controller apparatus in accordance with the fourth preferred embodiment of the present invention, the welded contactor can be specified with higher accuracy.

In the power supply controller apparatus in accordance with the fourth preferred embodiment of the present invention, by providing the impedance element as described above, the value of the amplitude level A of the input voltage $V_{in}$ inputted to the AC voltage detector 35A and the phase difference D between the phase of the AC voltage $V_{AC}$ and the phase of the AC current corresponding to the input voltage $V_{in}$ are different from each other depending on the welded contactor in the case that any contactor is welded. The CPU 93 can specify the welded contactor with higher accuracy by using the amplitude level A and the phase difference D. In accordance with the present invention, the power supply controller apparatus that can execute the welding detection with higher accuracy can be realized.

Fifth Preferred Embodiment

Figure 13:
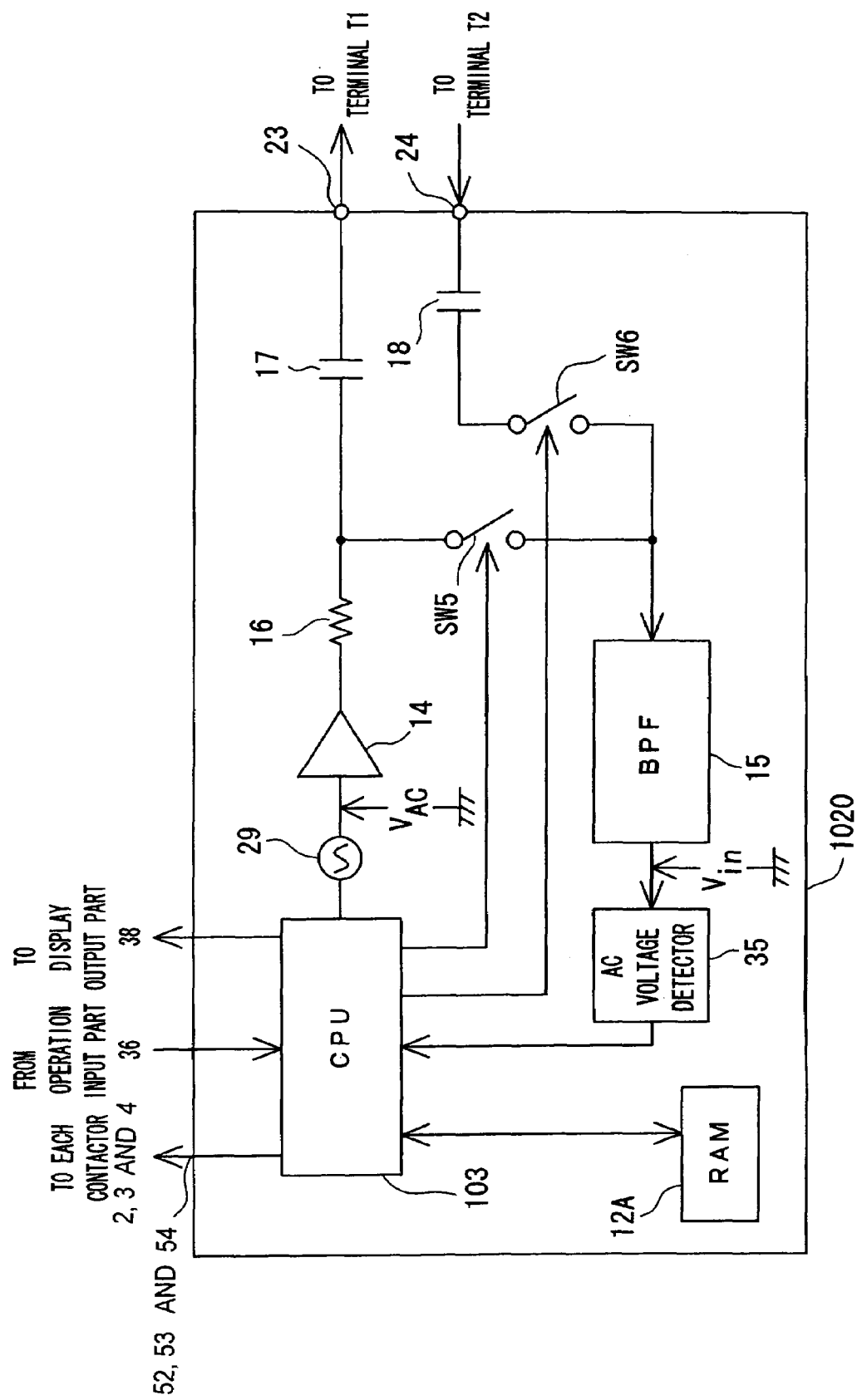
FIG. 13 is a block diagram showing a detailed configuration of a controller 1020 in accordance with a fifth preferred embodiment of the present invention.
Figure 14:
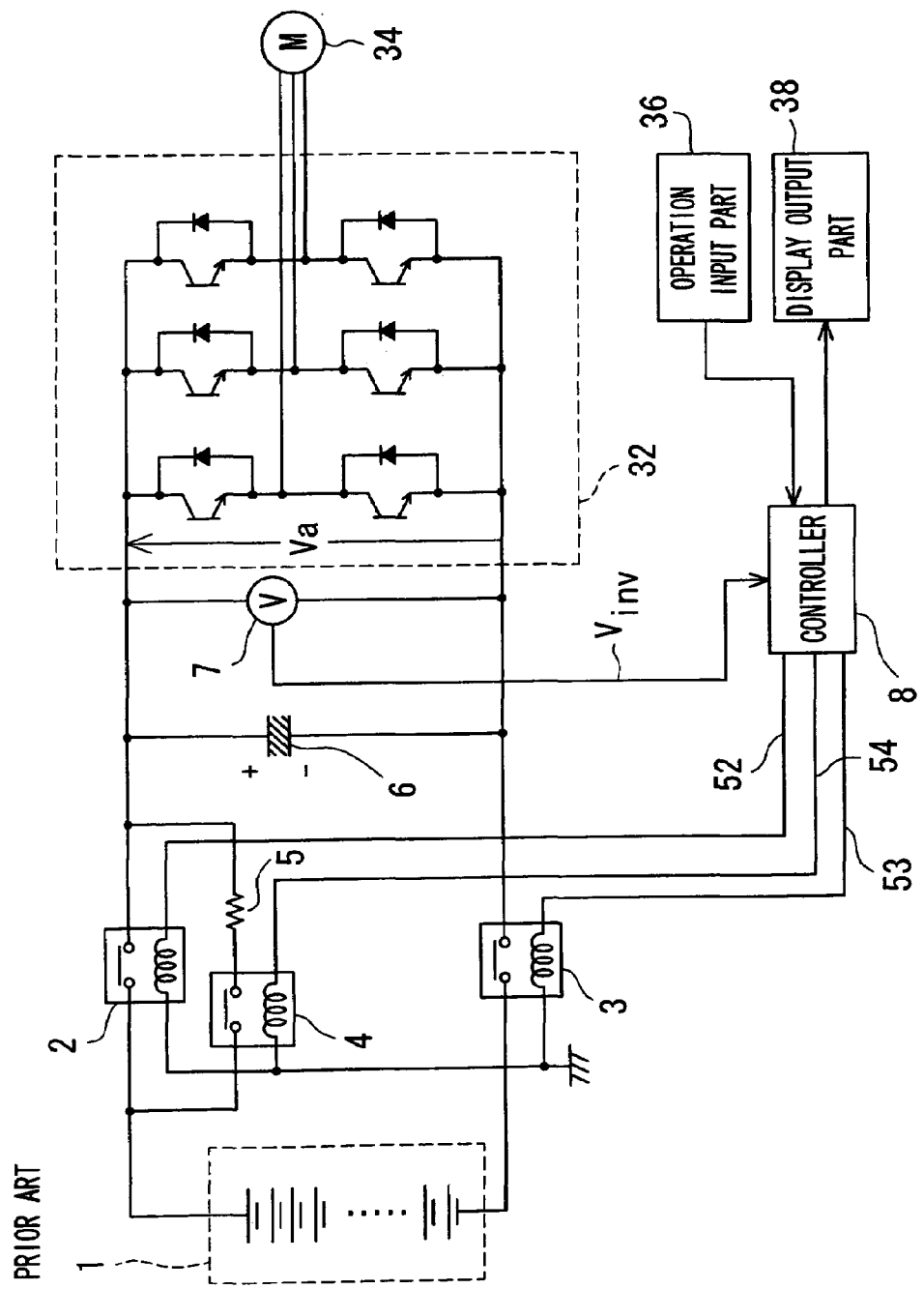
FIG. 14 is a block diagram showing a configuration of an electric vehicle having the power supply controller apparatus of a prior art.

Referring to FIG. 13, the power supply controller apparatus in accordance with the fifth preferred embodiment of the present invention will be described. The power supply controller apparatus in accordance with the fifth preferred embodiment of the present invention is different from the first preferred embodiment in that the power supply controller apparatus includes a controller 1020 instead of the controller 20 in the first preferred embodiment shown in FIG. 1. FIG. 13 is a block diagram showing a detailed configuration of the controller 1020 in accordance with the fifth preferred embodiment of the present invention. The controller 1020 includes a CPU 103 instead of the CPU 13 of the controller 20 of the first preferred embodiment shown in FIG. 2, and a RAM 12A instead of the RAM 12, further includes switches SW5 and SW6 in addition to the configuration of the controller 20 of the first preferred embodiment. In other respects, the configuration is similar to that of the first preferred embodiment. Components similar or equivalent to those in the first preferred embodiment are designated by the same numeral references, and their descriptions are omitted.

One end of the switch SW5 is connected to the connection point between the output impedance 16 and the first coupling capacitor 17, and the other end of the switch SW5 is connected to the input terminal of the BPF 15. The switch SW6 is provided between the connection point between the switch SW5 and the BPF 15 and the second coupling capacitor 18. The CPU 103 controls the switches SW5 and SW6 so that they complementarily switch over between turning on and off.

The CPU 103 such as a microcomputer or the like stores a program for executing a process for instructing the AC voltage generator 29 to output the AC voltage $V_{AC}$, a process for determining whether or not any contactor is welded depending on the amplitude level of the input voltage $V_{in}$ measured by the AC voltage detector 35, a process for determining whether or not leakage occurs in the pure electric vehicle depending on the amplitude level of the input voltage $V_{in}$ measured by the AC voltage detector 35, a process for an input signal from the operation input part 36, a process for controlling the contactors 2, 3 and 4 and the display output part 38, etc. The CPU 103 receives an input signal from the operation input part 36, and controls respective contactors 2, 3 and 4. The CPU 103 controls the switches SW5 and SW6 so that they complementarily switch over between turning on and off. The CPU 103, in a first mode, controls the switch SW5 to be turned on and the switch SW6 to be turned off to execute the leakage detection in the pure electric vehicle. The CPU 103, in a second mode, controls the switch SW5 to be turned off and the switch SW6 to be turned on to execute the welding detection. In the case that the CPU 103 determines that leakage or ground fault occurs or any contactor is welded, the CPU 103 outputs display information for notifying the operator of incidence of leakage or welding to the display output part 38, to display the same information thereon.

The RAM 12A stores a predetermined threshold value $A_{th}$ for use when the CPU 103 executes the welding detection of the contactors and a predetermined allowable value $A_{alw}$ for use when the CPU 103 executes the leakage detection of the electric vehicle.

Since the operation of the welding detection in the second mode (the switch SW5 is turned off, and the switch SW6 is turned on) is similar to that of the first preferred embodiment, its description is omitted. The operation of the leakage detection in the first mode (the switch SW5 is turned on, the switch SW6 is turned off) is described below.

The driver of the electric vehicle turns on the ignition key of the operation input part 36 to supply the power before the CPU 103 executes the leakage detection. In the state that the controller 1020 and the power supply apparatus 10 are electrically disconnected to each other, the CPU 103 instructs the AC voltage generator 29 to output an AC voltage $V_{AC}$ having 1 Hz and having a predetermined amplitude (e.g. 5V). At this timing, it is preferred that the first contactor 2 and the second contactor 3 are controlled to be turned on after the capacitor 6 is fully charged.

The AC voltage $V_{AC}$ from the AC voltage generator 29 is inputted to the AC voltage detector 35 as the input voltage $V_{in}$ through the buffer circuit 14, the output impedance 16, the switch SW5, and the BPF 15. The amplitude level of the input voltage $V_{in}$ detected by the AC voltage detector 35 at this timing is stored in the RAM 12A as a reference amplitude level $A_{ref}$. Since this process for detecting the reference amplitude level $A_{ref}$ requires that the controller 1020 and the power supply apparatus 10 be disconnected each other, it is preferred that the process is executed only once before shipment. However, a configuration having an additional switch for disconnecting the controller 1020 and the power supply apparatus 10 to update the reference amplitude level $A_{ref}$ after shipment may be applicable.

Next, in the state that the controller 1020 and the power supply apparatus 10 are connected to each other, the CPU 103 instructs the AC voltage generator 29 to output an AC voltage $V_{AC}$ having 1 Hz and having a predetermined amplitude (e.g. 5V) again. The AC voltage $V_{AC}$ from the AC voltage generator 29 is inputted to the AC voltage detector 35 as the input voltage $V_{in}$ through the buffer circuit 14, the output impedance 16, the switch SW5, and the BPF 15. The amplitude level of the input voltage $V_{in}$ detected by the AC voltage detector 35 at this timing is defined as A.

In the case that no leakage occurs in the pure electric vehicle, an insulation resistance of the power supply circuit constituted by the battery assembly 1, the respective contactors 2, 3 and 4, a current-limiting resistance 5, the capacitor 6, the inverter 32, and the motor 34, is set to be large enough in general. Therefore, the amplitude level A measured by the AC voltage detector 35 in the state that the controller 1020 and the power supply apparatus 10 are connected to each other is nearly equal to the reference amplitude level $A_{ref}$ measured by the AC voltage detector 35 in the state that the controller 1020 and the power supply apparatus 10 are electrically disconnected to each other.

On the contrary, in the case that leakage occurs in the electric vehicle, the insulation resistance value of the power source circuit becomes small. Therefore, the amplitude level A measured by the AC voltage detector 35 in the state that the controller 1020 and the power supply apparatus 10 are connected to each other is attenuated from the reference amplitude level $A_{ref}$ measured by the AC voltage detector 35 in the state that the controller 1020 and the power supply apparatus 10 are electrically disconnected to each other.

The CPU 103 compares the amplitude level A, which is measured by the AC voltage detector 35, to the reference amplitude level $A_{ref}$ which is stored in the RAM 12A. In the case that the amplitude level A is attenuated from the reference amplitude level $A_{ref}$ by a value larger than the predetermined allowable value $A_{alw}$, which is read out from the RAM 12A, (i.e. $A_{ref} - A \geq A_{alw}$), the CPU 103 determines that leakage occurs in the electric vehicle. The CPU 103 outputs display information to the display output part 38 to notify the operator of whether or not leakage occurs, depending on the results of the leakage detection described above.

In the power supply controller apparatus in accordance with the fifth preferred embodiment, the components of the circuit for the leakage detection are shared with those in the circuit for welding detection. This leads to that a power supply controller apparatus that executes the welding detection of the contactors at low cost can be realized. The CPU 103, by complementarily switching the switches SW5 and SW6, combines the function for detecting welding of the contactor in the power supply controller apparatus and the function for detecting leakage in the electric vehicle. In accordance with the present invention, by sharing a part of components for the welding detection with those in the circuit for leakage detection to reduce the cost, a power supply controller apparatus that executes the welding detection of the contactors at low cost can be realized.

The fifth preferred embodiment of the present invention is described with taking the configuration in which the switches SW5 and SW6 are added to the controller 20 of the first preferred embodiment as one example. However, without being limited to this, a configuration in which the switches SW5 and SW6 are added to the controller 20 in the second, third, or fourth preferred embodiment brings the same advantageous effect as that of the fifth preferred embodiment.

In above preferred embodiments, the AC voltage generator outputs a sinusoidal AC voltage. However, without being limited to this, a rectangular wave or a pulse wave may be applicable instead of a sinusoidal wave. Additionally, the sinusoidal wave may be generated by passing a PWM signal through an LPF.

In above preferred embodiments, the first terminal 23 of the controller is connected to the input terminal T1 of FIG. 1. However, without being limited to this, it may be connected to the positive electrode of the battery assembly or between any two single batteries (cells). Additionally, the second terminal 24 of the controller is connected to the output terminal T2 of FIG. 1. However, without being limited to this, it may be connected to one end of the opposite side to the battery assembly 1 of the parallel circuit, which is constituted by the first contactor 2 and the series circuit constituted by the third contactor 4 and the current-limiting resistance 5.

In above preferred embodiments, the welding detection of the contactors is executed immediately after the ignition key is turned on. However, without being limited to this, the welding detection of the contactors may be executed immediately after the ignition key is turned off, or both immediately after the ignition key is turned on and immediately after the ignition key is turned off, or at the other timing when all the contactors are controlled to be turned off. These bring the same advantageous effect as that of the second preferred embodiment.

In above preferred embodiments, the controller notifies the operator of incidence of the welding by display or sound on the display output part 38 in the case that the welding occurs. However, without being limited to this, the controller may notify the external unit (e.g. an ECU for a vehicle etc.) at the outside of the power supply controller apparatus.

In above preferred embodiments, the welding detection is executed for all of the first contactor 2, the second contactor 3, and the third contactor 4. However, without being limited to this, the welding detection may be executed for any one contactor or two contactors of above three contactors. For example, the welding detection for the second contactor 3 and the third contactor 4 may be executed by measuring the inverter voltage as described in the prior art, and the welding detection for the first contactor 2 may be executed using the method for welding detection of the contactor in accordance with the above embodiments.

The present invention is useful as a power supply controller apparatus, a power supply control method, a program, and a computer-readable recording medium being used in electric vehicles, such as pure electric vehicles (PEVs), hybrid electric vehicles (HEVs) and hybrid vehicles having fuel cells and secondary batteries or the like.

Although the present invention has been described with respect to its preferred embodiments in some detail, the disclosed contents of the preferred embodiments may change in the details of the structure thereof, and any changes in the combination and sequence of the component may be attained without departing from the scope and spirit of the claimed invention.

What is claimed is:

1. A power supply controller apparatus for use in a power supply apparatus comprising a battery assembly consisting of at least one secondary battery connected in series,
wherein said power supply apparatus further comprises a first contactor having one end connected to one end of said battery assembly, and a second contactor having one end connected to the other end of said battery assembly,
wherein said power supply controller apparatus comprises a controller for controlling supplying power to a load from said battery assembly through a capacitor connected between the other end of said first contactor and the other end of said second contactor, by turning on and off each of said contactors,
wherein said controller detects whether or not said each contactor is welded based on an output signal from one output terminal of one and the other ends of said capacitor, when said each contactor is controlled to be turned off and an AC signal is applied to one input terminal of (a) one end of said battery assembly, (b) the other end of said battery assembly, and (c) each connection point between secondary batteries of said battery assembly.

2. The power supply controller apparatus of claim 1,
wherein said power supply apparatus further comprises a series circuit including a resistance and a third contactor and being connected in parallel to said first contactor.

3. The power supply controller apparatus of claim 2,
wherein said controller detects whether or not said each contactor is welded based on a level of said output signal.

4. The power supply controller apparatus of claim 3,
wherein said controller applies the AC signal to the input terminal through a first impedance element, receives as the output signal, a level between both ends of a second impedance element having one end connected to the output terminal, and detects whether or not said each contactor is welded based on the level of the output signal, which is determined by impedance values of said first and second impedance elements and an impedance value of said capacitor.

5. The power supply controller apparatus of claim 2,
wherein said AC signal is a sinusoidal wave signal, and
wherein said controller detects whether or not said each contactor is welded based on a phase difference between the output signal and the AC signal, the phase difference changing depending on whether or not said each contactor is welded.

6. The power supply controller apparatus of claim 2,
wherein said controller detects the welding using a plurality of AC signals including a first AC signal having a first frequency and a second AC signal having a second frequency that is lower than the first frequency, and
wherein, in the case that said controller determines that any one of said contactors is welded after detecting the welding using the first AC signal, said controller detects the welding using the second AC signal.

7. The power supply controller apparatus of claim 6,
wherein said controller further comprises a filter provided at an output terminal for receiving the output signal, said filter selectively passing therethrough a frequency component of the first AC signal and a frequency component of the second AC signal, which are included in the output signal.

8. The power supply controller apparatus of claim 2,
wherein said controller further comprises a filter provided at an input terminal for receiving the output signal, said filter passing therethrough at least a frequency component of the AC signal included in the output signal.

9. The power supply controller apparatus of claim 2, wherein, upon outputting the AC signal to said power supply apparatus and blocking input of the output signal to said controller, said controller detects leakage in said power supply apparatus by comparing a level of the AC signal returning to said controller through said power supply apparatus, with a level of the AC signal outputted from said controller.

10. The power supply controller apparatus of claim 1, wherein said controller detects whether or not said each contactor is welded based on a level of the output signal.

11. The power supply controller apparatus of claim 10, wherein said controller applies the AC signal to the input terminal through a first impedance element, receives as the output signal, a level between both ends of a second impedance element having one end connected to the output terminal, and detects whether or not said each contactor is welded based on the level of the output signal, which is determined by impedance values of said first and second impedance elements and an impedance value of said capacitor.

12. The power supply controller apparatus of claim 1, wherein said AC signal is a sinusoidal wave signal, and wherein said controller detects whether or not said each contactor is welded based on a phase difference between the output signal and the AC signal, the phase difference changing depending on whether or not said each contactor is welded.

13. The power supply controller apparatus of claim 1, wherein said controller detects the welding using a plurality of AC signals including a first AC signal having a first frequency and a second AC signal having a second frequency that is lower than the first frequency, and
wherein, in the case that said controller determines that any one of said contactors is welded after detecting the welding using the first AC signal, said controller detects the welding using the second AC signal.

14. The power supply controller apparatus of claim 13, wherein said controller further comprises a filter provided at an output terminal for receiving the output signal, said filter selectively passing therethrough a frequency component of the first AC signal and a frequency component of the second AC signal, which are included in the output signal.

15. The power supply controller apparatus of claim 1, wherein said controller further comprises a filter provided at an input terminal for receiving the output signal, said filter passing therethrough at least a frequency component of the AC signal included in the output signal.

16. The power supply controller apparatus of claim 1, wherein, upon outputting the AC signal to said power supply apparatus and blocking input of the output signal to said controller, said controller detects leakage in said power supply apparatus by comparing a level of the AC signal returning to said controller through said power supply apparatus, with a level of the AC signal outputted from said controller.

17. A power supply control method for use in a power supply apparatus comprising a battery assembly consisting of at least one secondary battery connected in series,
wherein said power supply apparatus further comprises a first contactor having one end connected to one end of said battery assembly, and a second contactor having one end connected to the other end of said battery assembly,
wherein said power supply control method comprises a control step for controlling supplying power to a load from said battery assembly through a capacitor connected between the other end of said first contactor and the other end of said second contactor, by turning on and off each of said contactors,
wherein said control step detects whether or not said each contactor is welded based on an output signal from any one output terminal of one and the other ends of said capacitor, when said each contactor is controlled to be turned off and an AC signal is applied to any one input terminal of (a) one end of said battery assembly, (b) the other end of said battery assembly, and (c) each connection point between secondary batteries of said battery assembly.

18. A program including a power supply control method for use in a power supply apparatus comprising a battery assembly consisting of at least one secondary battery connected in series,
wherein said power supply apparatus further comprises a first contactor having one end connected to one end of said battery assembly, and a second contactor having one end connected to the other end of said battery assembly,
wherein said power supply control method comprises a control step for controlling supplying power to a load from said battery assembly through a capacitor connected between the other end of said first contactor and the other end of said second contactor, by turning on and off each of said contactors,
wherein said control step detects whether or not said each contactor is welded based on an output signal from any one output terminal of one and the other ends of said capacitor, when said each contactor is controlled to be turned off and an AC signal is applied to any one input terminal of (a) one end of said battery assembly, (b) the other end of said battery assembly, and (c) each connection point between secondary batteries of said battery assembly.

19. A computer-readable recording medium storing a program including a power supply control method for use in a power supply apparatus comprising a battery assembly consisting of at least one secondary battery connected in series,
wherein said power supply apparatus further comprises a first contactor having one end connected to one end of said battery assembly, and a second contactor having one end connected to the other end of said battery assembly,
wherein said power supply control method comprises a control step for controlling supplying power to a load from said battery assembly through a capacitor connected between the other end of said first contactor and the other end of said second contactor, by turning on and off each of said contactors,
wherein said control step detects whether or not said each contactor is welded based on an output signal from any one output terminal of one and the other ends of said capacitor, when said each contactor is controlled to be turned off and an AC signal is applied to any one input terminal of (a) one end of said battery assembly, (b) the other end of said battery assembly, and (c) each connection point between secondary batteries of said battery assembly.

* * * * *